United States Patent
Dender et al.

(10) Patent No.: US 10,931,438 B2
(45) Date of Patent: Feb. 23, 2021

(54) GENERATING A REPRESENTATIVE ARTICLE

(71) Applicant: International Business Machines Corporation, Armonk, NY (US)

(72) Inventors: Lisa M. Dender, Maryville, TN (US); Matthew Chalkley, Dunshaughlin (IE); Robert T. Sanders, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 16/101,668

(22) Filed: Aug. 13, 2018

(65) Prior Publication Data
US 2020/0052883 A1 Feb. 13, 2020

(51) Int. Cl.
*H04L 29/06* (2006.01)
*H04L 9/06* (2006.01)
(Continued)

(52) U.S. Cl.
CPC ....... *H04L 9/0637* (2013.01); *G06Q 10/0875* (2013.01); *G06Q 30/0282* (2013.01)

(58) Field of Classification Search
CPC ... H04L 9/0637; H04L 63/00; H04L 2209/38; H04L 9/3239; G06Q 10/0875; G06Q 30/0282
See application file for complete search history.

(56) References Cited

U.S. PATENT DOCUMENTS

| 10,790,976 B1 * | 9/2020 | Raevsky ............... H04L 9/0894 |
| 2009/0083054 A1 | 3/2009 | Koo et al. |

(Continued)

FOREIGN PATENT DOCUMENTS

| RU | 2639015C1 C1 | 12/2017 |
| WO | 2017027648 A1 | 2/2017 |
| WO | 2017165909 A1 | 10/2017 |

OTHER PUBLICATIONS

F. Tian, "An agri-food supply chain traceability system for China based on RFID & blockchain technology," 2016 13th International Conference on Service Systems and Service Management (ICSSSM), Kunming, 2016, pp. 1-6.
(Continued)

*Primary Examiner* — Mahfuzur Rahman

(57) ABSTRACT

An example operation may include one or more of retrieving a first disclosure for a first component, the disclosure including one or more first substances of note (SN) and corresponding first SN values from a blockchain, and determining a second disclosure for a second component comparable to the first component, the disclosure disclosing one or more second SN and corresponding second SN values. An example operation may further include one or more of generating a representative article including a common group of SN and representative SN common group values for each SN of the common group, a first remaining SN group of first SNs not included in the common group of SN and corresponding representative first SN values, and a second remaining SN group of second SNs not included in the common group of SN and corresponding representative second SN value, where the representative article represents the use of either the first component or the second comparable component.

17 Claims, 15 Drawing Sheets

(51) Int. Cl.
*G06Q 10/08* (2012.01)
*G06Q 30/02* (2012.01)

(56) References Cited

U.S. PATENT DOCUMENTS

| | | | |
|---|---|---|---|
| 2015/0221045 A1* | 8/2015 | Heckler | G06Q 40/12 705/30 |
| 2016/0098723 A1 | 4/2016 | Feeney | |
| 2016/0098730 A1 | 4/2016 | Feeney | |
| 2016/0269182 A1 | 9/2016 | Sriram et al. | |
| 2017/0262862 A1 | 9/2017 | Aljawhari | |
| 2017/0331896 A1 | 11/2017 | Holloway et al. | |
| 2018/0001184 A1* | 1/2018 | Tran | A63B 43/004 |
| 2018/0041345 A1* | 2/2018 | Maim | G06F 21/51 |
| 2018/0130158 A1* | 5/2018 | Atkinson | G06Q 50/28 |
| 2018/0144156 A1* | 5/2018 | Marin | G06F 21/6272 |
| 2018/0337769 A1* | 11/2018 | Gleichauf | G06Q 20/065 |
| 2019/0087892 A1* | 3/2019 | Pinski | G06Q 20/108 |
| 2019/0156000 A1* | 5/2019 | Hoffmann | G06F 21/41 |
| 2019/0236594 A1* | 8/2019 | Ehrlich-Quinn | G06Q 20/065 |
| 2019/0305938 A1* | 10/2019 | Sandberg-Maitland | H04L 9/321 |
| 2019/0312734 A1* | 10/2019 | Wentz | H04L 9/3247 |
| 2019/0340609 A1* | 11/2019 | Mayadas | H04L 9/3239 |
| 2020/0028688 A1* | 1/2020 | Takada | H04L 9/3239 |

OTHER PUBLICATIONS

H. Sternberg, "Chains in Chains—Logic and Challenges of Blockchains in Supply Chains." Proceedings of the 51st—Hawaii International Conference on System Sciences, 2018, pp. 3936-3943 http://hdl.handle.net/10125/50382.

J. Lee, "How the Blockchain Revolution Will Reshape the Consumer Electronics Industry [Future Directions]," in IEEE Consumer Electronics Magazine, vol. 6, No. 3, pp. 19-23, Jul. 2017.

S. Abeyratne, "Blockchain ready manufacturing supply chain using distributed ledger." International Journal of Research in Engineering and Technology, 05(09), pp. 1-10, 2016.

T. Bocek, "Blockchains everywhere—a use-case of blockchains in the pharma supply-chain," 2017 IFIP/IEEE Symposium on Integrated Network and Service Management (IM), Lisbon, 2017, pp. 772-777.

Y. Madhwal, "Blockchain and Supply Chain Management: Aircrafts' Parts' Business Case." Annals of DAAAM & Proceedings. 2017, vol. 28, p. 1051-1056. 6p.

* cited by examiner ent in their electronics product may become inaccurate due to an upstream vendor part substitutions. Such changes upstream in the supply chain are often communicated downstream slowly if at all. As such, what is needed is something else to overcome these limitations.

GENERATING A REPRESENTATIVE ARTICLE

TECHNICAL FIELD

This application generally relates to material content data disclosure, and more particularly, to generating a representative article to disclose material content data.

BACKGROUND

A ledger is commonly defined as an account book of entry, in which transactions are recorded. A distributed ledger is ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. A blockchain is a distributed database that maintains a continuously-growing list of records in a blockchain's blocks, which are secured from tampering and revision due to their immutable properties. Each block contains a timestamp and a link to a previous block. A blockchain can be used to hold, track, transfer and verify information. Since a blockchain is a distributed system, before adding a transaction to a blockchain ledger, all peers need to reach a consensus status.

Conventionally, article disclosures are required for articles, such as for a product or component in a product, to disclose amounts of certain Substances of Note (SN) within the article to ensure that the SNs amounts are under a particular threshold. Article disclosures may be for regulatory purposes, for example, disclosing Substances of Very High Concern (SVHC) for the article to a government agency, or may be for business reasons. Articles are typically built from many component parts and assemblies.

In some cases, a manufacturer may have multiple comparable components that match a particular form, fit and function for an article in their product. For example, an electronic circuit board manufacturer may have a selection of several comparable capacitors that may be utilized at a particular location of a circuit board, where each possible capacitor matches the form (i.e., capacitor type), fit (i.e., fits in the space allotted on the board), and function (i.e., has the required electrical specifications/characteristics). The circuit board manufacturer may have a choice of multiple vendors for comparable parts that meet the form, fit and function, however, the composition of the comparable part from each vendor may differ with respect to SNs. Building the circuit board with the component from one vendor results in one disclosure with regards to the SNs, however, results in a different disclosure with a comparable component from another vendor. Thus, if a component from one vendor is substituted with a comparable one (from the same or another vendor), a current disclosure for regulatory or other purposes becomes inaccurate. Component substitutions may occur often, for example, where a particular component becomes unavailable. Typically, multiple components of a circuit board may each have several comparable components.

The problem of inaccurate disclosure is exacerbated where the electrical circuit board is included in another product. For example, a product disclosure for the circuit board provided to another downstream manufacturer that includes the circuit board in their electronics product may become inaccurate if a part substitution for the circuit board occurs. As the product manufacturer also provides a disclosure as to SNs present in their electronics product, a disclosure for the electronics product may be inaccurate due to an upstream vendor part substitutions. Such changes upstream in the supply chain are often communicated downstream slowly if at all. As such, what is needed is something else to overcome these limitations.

SUMMARY

One example embodiment may provide a method that includes one or more of retrieving a first disclosure for a first component, the disclosure including one or more first substances of note (SN) and corresponding first SN values from a blockchain, and determining a second disclosure for a second component comparable to the first component, the disclosure disclosing one or more second SN and corresponding second SN values. The example embodiment of the method may further include one or more of generating a representative article including a common group of SN and representative SN common group values for each SN of the common group, a first remaining SN group of first SNs not included in the common group of SN and corresponding representative first SN values, and a second remaining SN group of second SNs not included in the common group of SN and corresponding representative second SN values, where the representative article represents the use of either the first component or the second comparable component.

Another example embodiment may provide a system that includes a processor and memory, wherein the processor is configured to perform one or more of retrieve a first disclosure for the first component from the blockchain, the disclosure that includes one or more first substances of note (SN) and corresponding first SN values, and determine a second disclosure for a second component comparable to the first component, the disclosure that includes one or more second SN and corresponding second SN values. The processor is further configured to perform one or more of generate a representative article that includes a common group of SN and representative SN common group values for each SN of the common group, a first remaining SN group of first SNs not included in the common group of SN and corresponding representative first SN values, and a second remaining SN group of second SNs not included in the common group of SN and corresponding representative second SN values, where the representative article represents the use of either the first component or the second comparable component.

A further example embodiment may provide a non-transitory computer readable medium comprising instructions, that when read by a processor, cause the processor to perform one or more of retrieving a first disclosure for a first component, the disclosure including one or more first substances of note (SN) and corresponding first SN values from a blockchain and determining a second disclosure for a second component comparable to the first component, the disclosure disclosing one or more second SN and corresponding second SN values. The instructions may further cause the processor to perform one or more of generating a representative article including a common group of SN and representative SN common group values for each SN of the common group, a first remaining SN group of first SNs not included in the common group of SN and corresponding representative first SN values, and a second remaining SN group of second SNs not included in the common group of SN and corresponding representative second SN values, where the representative article represents the use of either the first component or the second comparable component.

DETAILED DESCRIPTION

Figure 1A:
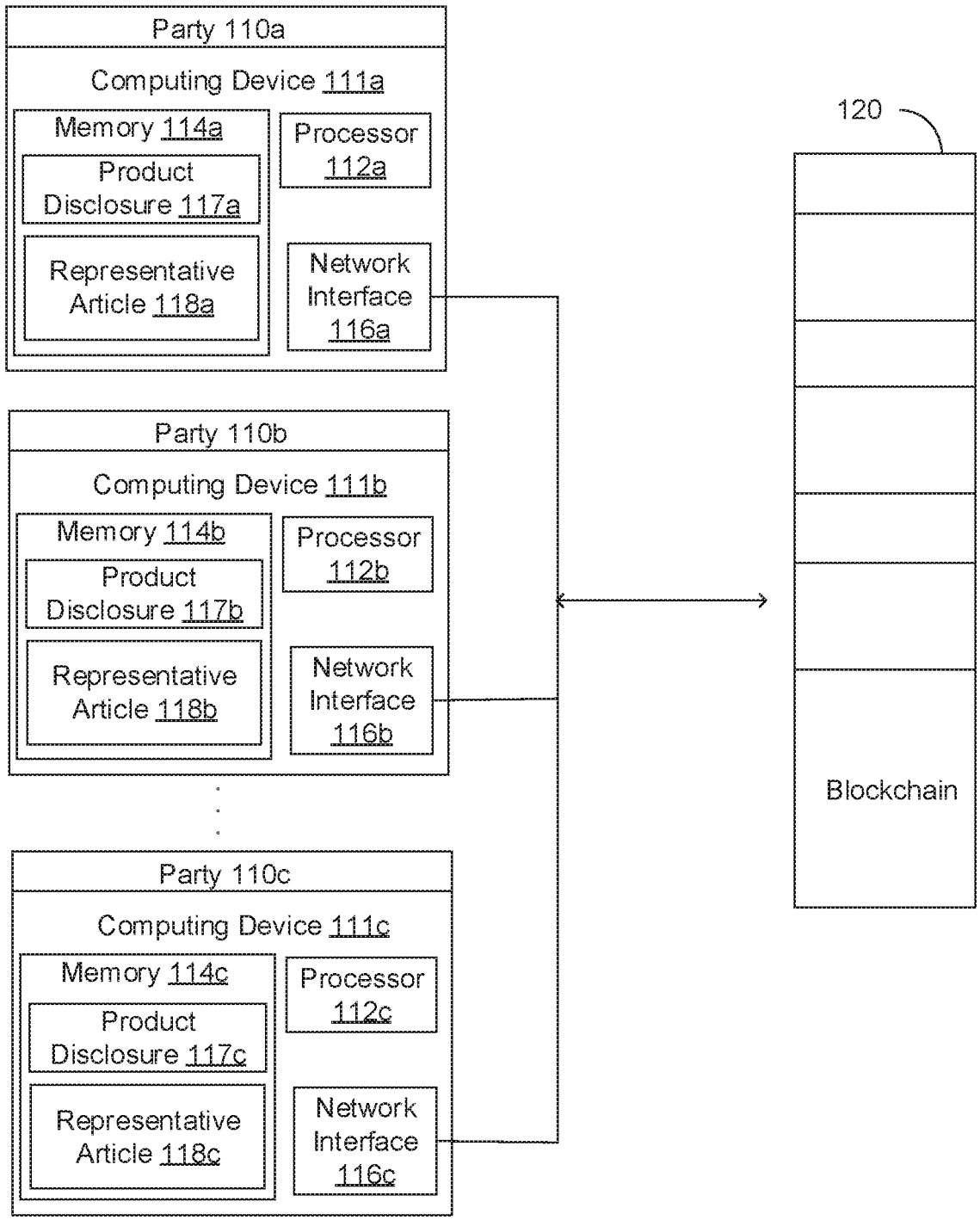
FIG. 1A illustrates a network diagram of generating a representative article with a blockchain, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, non-transitory computer readable media, devices, and/or networks, which provide (Insert the title and any related information here).

A blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockhcain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

The example embodiments are directed to methods, devices, networks, non-transitory computer readable media and/or systems, which support a blockchain solution that includes near real-time sharing of material content data (for example, Substances of Note (SN) that may include Substances of Very High Concern (SVHC)) as representative articles, that may be added to a blockchain by actors/vendors in the supply chain. Some of the benefits of such a solution include the sharing providing confidence to downstream manufacturers as to the accuracy of the material content data of an article being current, even where comparable component substitutions occur upstream in the manufacturing process. Any changed upstream product disclosure data may propagate to downstream manufacturers through the blockchain, allowing any affected downstream product disclosures to be updated.

In addition, where the substitution of comparable parts meeting form, fit and function occurs in a product, the representative article representing that product accounts for the substitution without the need for a new product disclosure. Thus, downstream vendor or manufacturer product disclosures are less likely to be affected by upstream comparable component substitutions, if at all. This may provide the downstream manufacturer a greater confidence in the accuracy of their own product disclosure(s), and a better indication as to whether their product exceed SN thresholds set by government regulations, or for business purposes, etc.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the sharing of material content data via a representative article is implemented due to the immutable, smart contracts, security, privacy aspects, distribution, consensus and endorsement attributes which are inherent and unique to blockchain. In particular, the immutable nature of blockchain provides all vendor users increased confidence as to disclosures created using representative articles, and may allow such users to trace the origins and supporting documentation for the representative article. The smart contract enables the transparent sharing of product material content information of representative articles that may utilize a common disclosure format. Further, the smart contract may be used to guard potentially proprietary information within a representative article for the vendor product or part, that may lead to a more complete disclosure of SNs.

Security is enhanced for representative articles, as the smart contract may be utilized to restrict access to members of the blockchain approved by the blockchain participants. The ability to control privacy of the representative article allows a vendor to retain control of their representative article, through the shared permission protocols set up in the smart contracts. The blockchain decentralized content attribute allows the distribution and sharing of the representative article, thereby reducing the risk of tampering, while allowing for the transmission of a representative article and updates thereto in near real-time for use by other vendors utilizing the blockchain.

All members of the blockchain have a vested interest in the accuracy and completeness of the product chemical content data entered into the blockchain through the representative article, as it affects downstream manufacturers relying thereon. The endorsement and consent/validation attributes of the blockchain may be utilized to indicate the approval and legal certification of the representative article for legal reporting purposes through each stage of the supply chain.

One of the benefits of example embodiments is an improvement of the functionality of a computing system by utilizing a representative article to improve the communication of product material data content (and updates thereto) through the blockchain. Another benefit of disclosing material data content via a representative article, allows comparable part substitution to be accounted for by a single representative article, rather than relying on multiple product disclosures for each possible permutation of comparable substitutions. Thus, the representative article disclosure saves memory storage, and computer processing cycles otherwise required in sifting through and managing the multiple product disclosures replaced by the representative article. Through the blockchain solution described herein, a computing system can perform novel functionality by utilizing a representative article to disclose material content data for a product, thereby more efficiently utilizing storage space, while conserving computer processing cycles. As the representative article may replace multiple product disclosures, blockchain traffic is reduced.

The example embodiments provide numerous benefits over a traditional database. For example, various advantages are achieved through the providing of material content data for a product using a representative article on a blockchain, allowing near real-time access to the representative article and/or updates thereto for blockchain members. In addition, the use of a representative article for products where components may be substituted-out, or where no disclosure for components have been provided from an upchain vendor, provides a more accurate material content data to downstream vendors that may be utilized with confidence in compiling and providing their own product disclosures.

Meanwhile, a traditional database could not be used to implement the example embodiments, as individual databases lack the communication interconnectability and consensus aspects provided by a blockchain, preventing transparency and hindering the accessibility and reliability of product disclosures. In addition or in the alternative, conventional systems do not allow for a representative article that may account for upstream comparable component substitutions that could render downstream disclosures inaccurate, or account for missing component material content data. Meanwhile, if a traditional database were used to implement the example embodiments, the example embodiments would suffer from unnecessary drawbacks such as delayed transfer between vendors and manufacturers within the supply chain, and increased storage requirements and processor cycles at each computer maintaining a database, to maintain multiple product disclosures accounting for substitutions of comparable components that may occur within the supply chain. Accordingly, the example embodiments provide for a specific solution to a problem in the arts/field of generating a representative article.

FIG. 1A illustrates a logic network diagram of generating a representative article according to example embodiments. Referring to FIG. 1A, the network 100 includes a peer network representing a plurality of parties, including a party 110a using computing device 111a, communicatively coupled with a party 110b using computing device 111b and a party 110c using computing device 111c. Computing device 111a may include a processor 112a, coupled with a memory 114a and a network interface 116a. The memory 114a may include a disclosure(s) 117a and a representative article(s) 118a. Computing devices 111b and 111c may be similar in structure.

Party 110a, party 110b and party 110c may represent vendors and/or manufacturers of a supply chain, that manufacture and/or sell articles, for example, components, parts or products. The party 110a, party 110b and party 110c may represent vendors and/or manufacturers at the same or different stages of a supply chain. Thus, for example, party 110a may be an article manufacturer that manufactures components, for example, electrical components, that are utilized within circuit boards manufactured by party 110b, that are in turn used in party 110c's consumer electronic product. Other parties may be included, and party 110a, party 110b and party 110c are merely representative.

Typically, for regulatory and/or for business purposes, party 110a, party 110b and party 110c prepare product disclosures that list the composition of certain substances of note (SN), for example, substances of very high concern (SVHC) for the components, parts, or products that they sell. For example, for regulatory purposes, substances such as lead, asbestos and mercury that may be harmful to consumers or the environment are disclosed, to ensure that the SN are below certain thresholds set by the regulatory agency. In other situations, for example, for business purposes or to meet governmental labeling requirements, product disclosures may include SN such as recycled plastic, aluminum content, natural vs. artificial substance content, etc. . . . used within the particular article.

Referring back to FIG. 1A, parties 110a, 110b and 110c may provide product disclosures, for example, disclosure(s) 117a, to disclose the content of SN and the amounts thereof for the particular article, component and/or product that they manufacture. In accordance with some embodiments, the parties may share material content data using a representative article, for example, of representative articles 118a, that may be placed on a blockchain 120. The representative article 118a may be generated using product disclosures provided via the blockchain 120, and/or via product disclosures 117a. The representative article may represent a virtual record approximating the chemical content of the article, that may account for all SNs within the article, or a subset thereof.

A channel of the blockchain 120 may be utilized for each representative article for each party, where the channel ledger maintains an original representative article as well as any subsequent updates. A channel state database provides current information for the representative article. Alternatively, a channel of a blockchain may be utilized by a party for all disclosures of components, articles and/or products that they manufacture, where the channel ledger maintains state information for all iterations/updates of the representative articles, and the state database provides the current state for the representative articles maintained at the channel. A party may utilize their own blockchain to maintain their disclosures in the fashion desired (i.e., one blockchain channel per disclosure).

When a party, for example, 110b, purchases a particular component or article from another party, for example, party 110a, party 110a may provide an invitation to party 110b to join a particular blockchain or blockchain channel. Party 110b joining the blockchain or blockchain channel includes adherence to the smart contract that governs membership, behavior, permissions, etc for the blockchain or blockchain channel, for example, within the blockchain 120, where the representative article for the purchased component or article is maintained. Thus, party 110a may utilize one or more blockchain channels on the blockchain 120 to maintain the representative article, for example, representative articles 118a, for the components or articles party 110a manufactures. Access to the disclosures may then be controlled as indicated in the smart contract governing the blockchain channel. The smart contract may indicate whether the disclosure is open, or accessible only through permissions granted to some through the smart contract. The smart contract may further control whether the disclosure of the purchased product may be completely copied onto another blockchain or blockchain channel, or only used for incorporation within the disclosure of the downstream vendor that purchased the product.

Thus, utilization of the blockchain 120 for generating and maintaining representative articles for party 110a provides downstream manufacturer party 110b confidence that the disclosure for party 110b's product is accurate and current, as any update or changes to the representative article(s) 118a is represented at the current state database for the channel available to party 110b in virtually real time. Party 110a may provide their representative articles 118a with confidence that any proprietary information may be protected, as the smart contract of the blockchain or blockchain channel controls access to the representative article data.

As the material content data is provided as a representative article, for example, representative article(s) 118a, comparable component substitutions may be accounted for without the need to generate a new disclosure of material content data. For example, the party 110a may generate a representative article, for example, representative article(s) 118a, created to account for various comparable component substitutions between product disclosure(s) 117a. When a substitution to a comparable component occurs in the manufacture of party 110a's product, the representative article remains accurate as to the material content data it discloses, and thus there is no need for an update. Comparable component substitutions may be made, for example, due to the unavailability of a particular component. Likewise, any product disclosures for downstream manufacturers relying on the representative article are unaffected, remaining accurate.

In another example embodiment, the representative article(s) 118a may account for components within a party's 110a product for which no product disclosure is available. In this case, the representative article may be generated from or accounting for laboratory chemical make-up analysis to determine SNs of the product. Instead, the representative article may be determined from a survey of manufacturers of comparable components, requesting the presence of certain SNs, and accounting for the survey in the creation of the representative article for which no disclosure is provided. Such accounting may be as a "worst case" accounting, where the existence of SNs of comparable products causes inclusion of the SN in the representative article, at the greatest amount identified through the surveying for each SN. The representative article may thus allow for a more accurate disclosure for downstream manufacturers should a particular substitution occur, and/or where components are used in party 110a's product that otherwise have no disclosure. Further, use of the representative article(s) 118a on a blockchain 120 allows for the more efficient maintaining and handling of material content data disclosures, reducing the number of product disclosures otherwise required, and reducing the need for updates where substitutions occur. This may save the multiple communications and propagation delays otherwise experienced between vendors in the supply chain where upstream component substitutions are made within an article or product.

The network 100 and computing devices 111a, 111b and 111c makeup will be discussed below in more detail with respect to the FIG. 2A, FIG. 3, FIGS. 6A-6B AND FIG. 7.

In some aspects, representative articles may be generated and stored as the representative article(s) 118a in memory 114a. The material data content information to generate a representative article may come from product disclosures, for example, product disclosures 117a, or may come from other representative articles. The representative article(s) 118a may include SNs and amounts (i.e. weights or volume information) thereof for one or more articles (i.e., components or products) manufactured by party 110a. The representative article may include additional information, for example, total weight of the article, version information, part number information, weighting factor information, safety factor accounting, and/or the method used to generate the representative article.

Figure 1B:
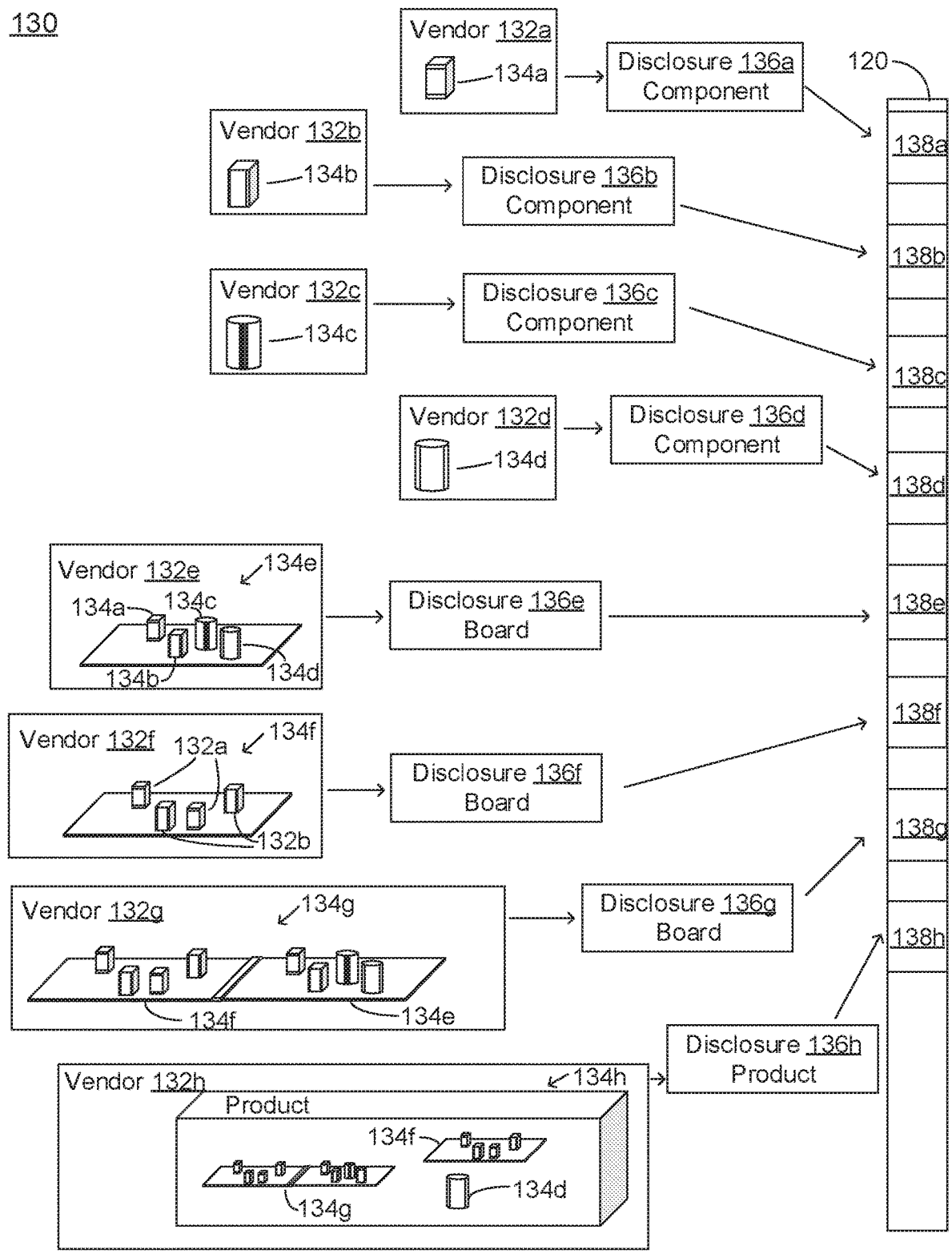
FIG. 1B illustrates another network diagram of a peer network that may utilize a blockchain to maintain representative articles and product disclosures, according to example embodiments.
Figure 1C:
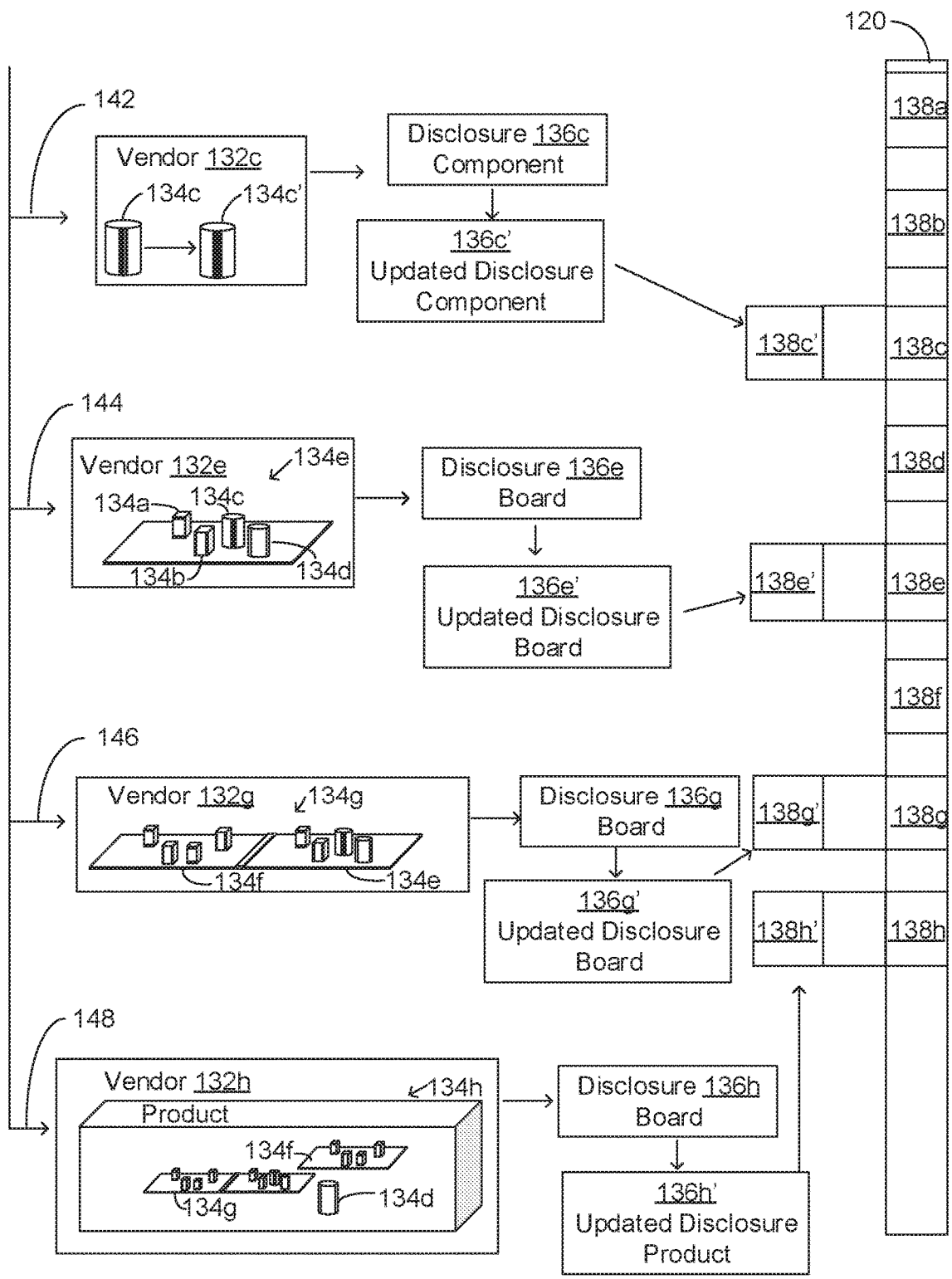
FIG. 1C illustrates a network logic diagram for providing disclosure updates with a blockchain, according to example embodiments.
Figure 1D:
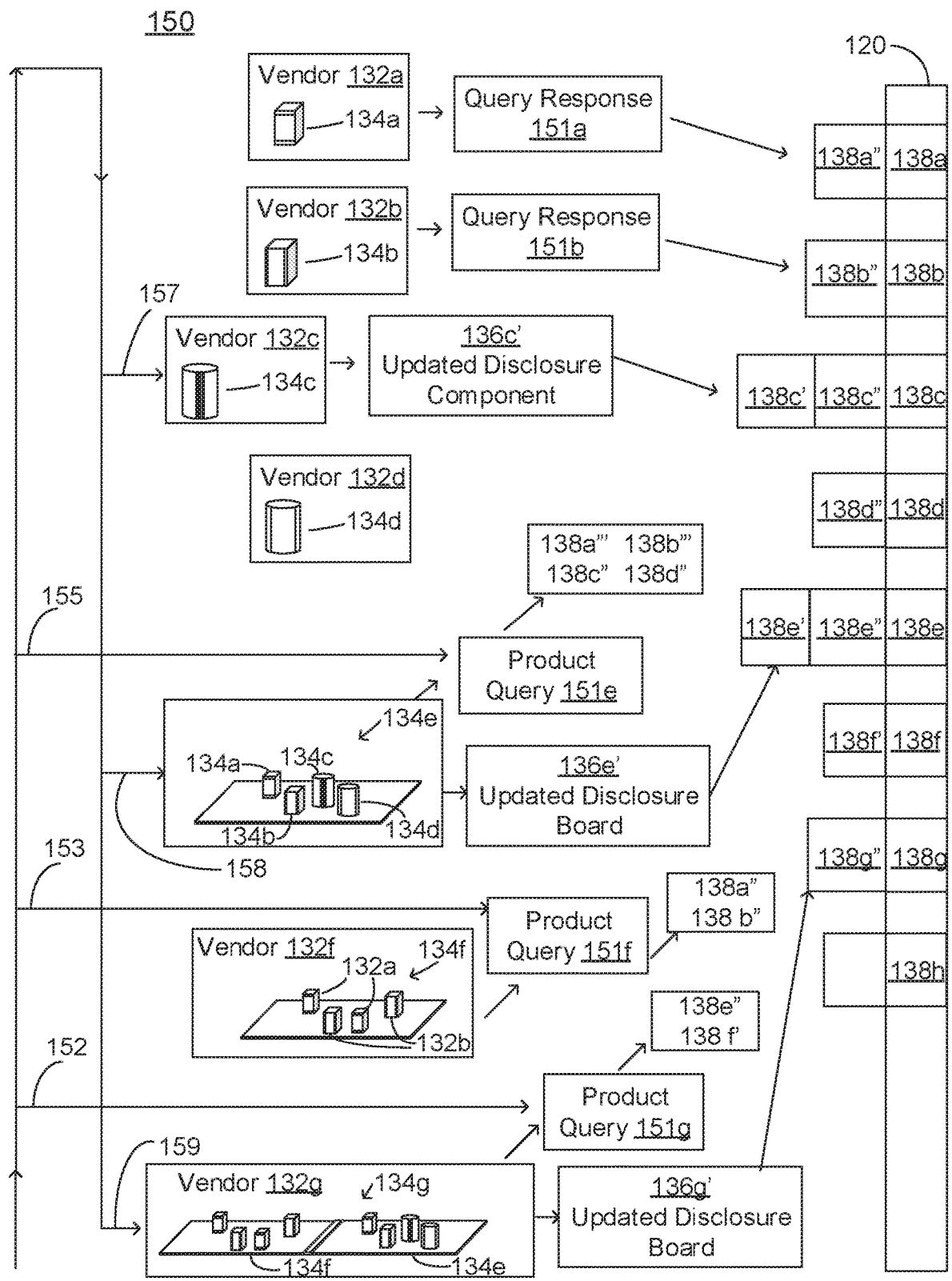
FIG. 1D illustrates another network logic diagram of updating a representative article with a blockchain responsive to an upstream communication, according to example embodiments.
Figure 1E:
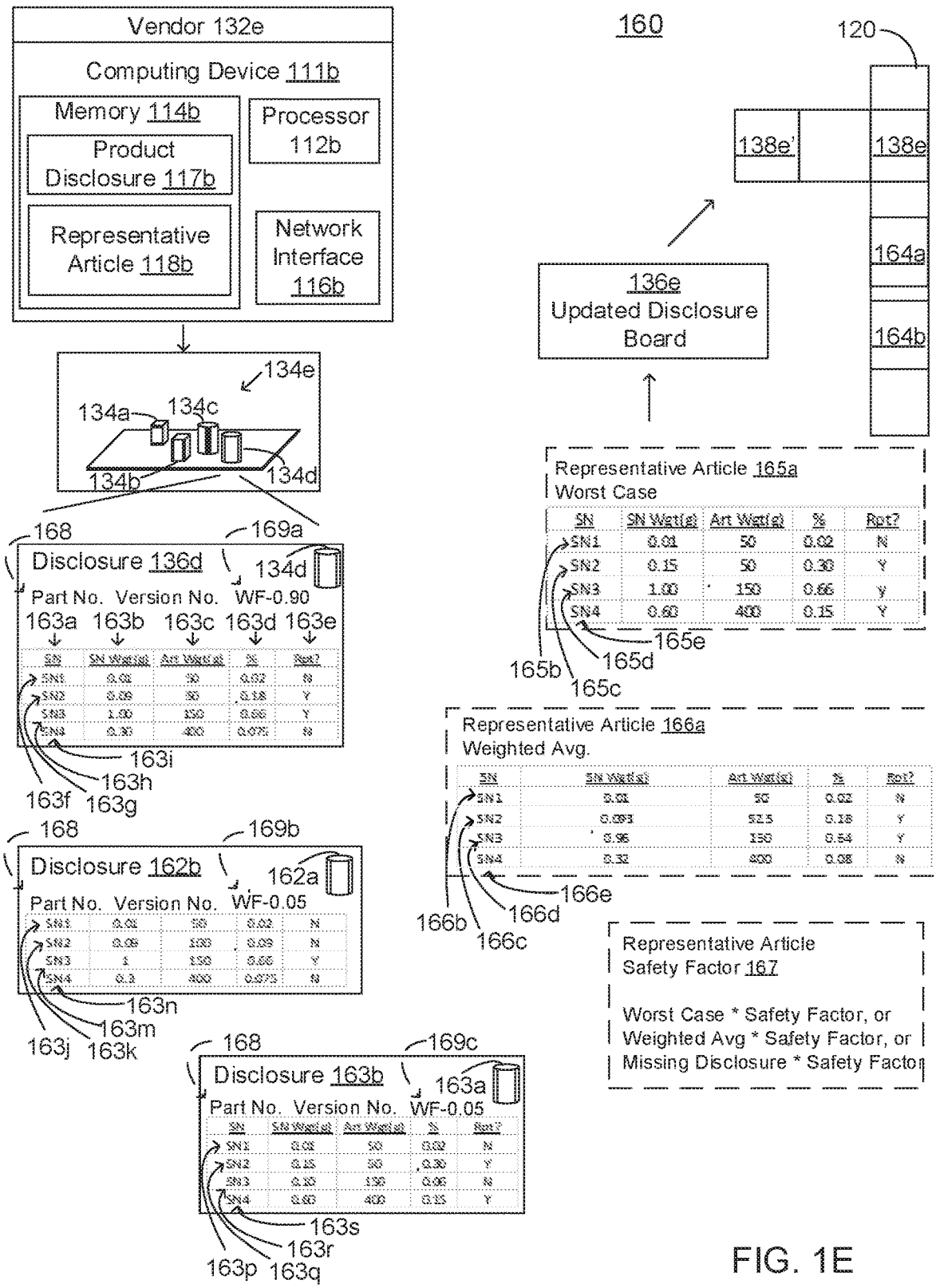
FIG. 1E illustrates another network logic diagram of generating a representative article with a blockchain, according to example embodiments.
Figure 1F:
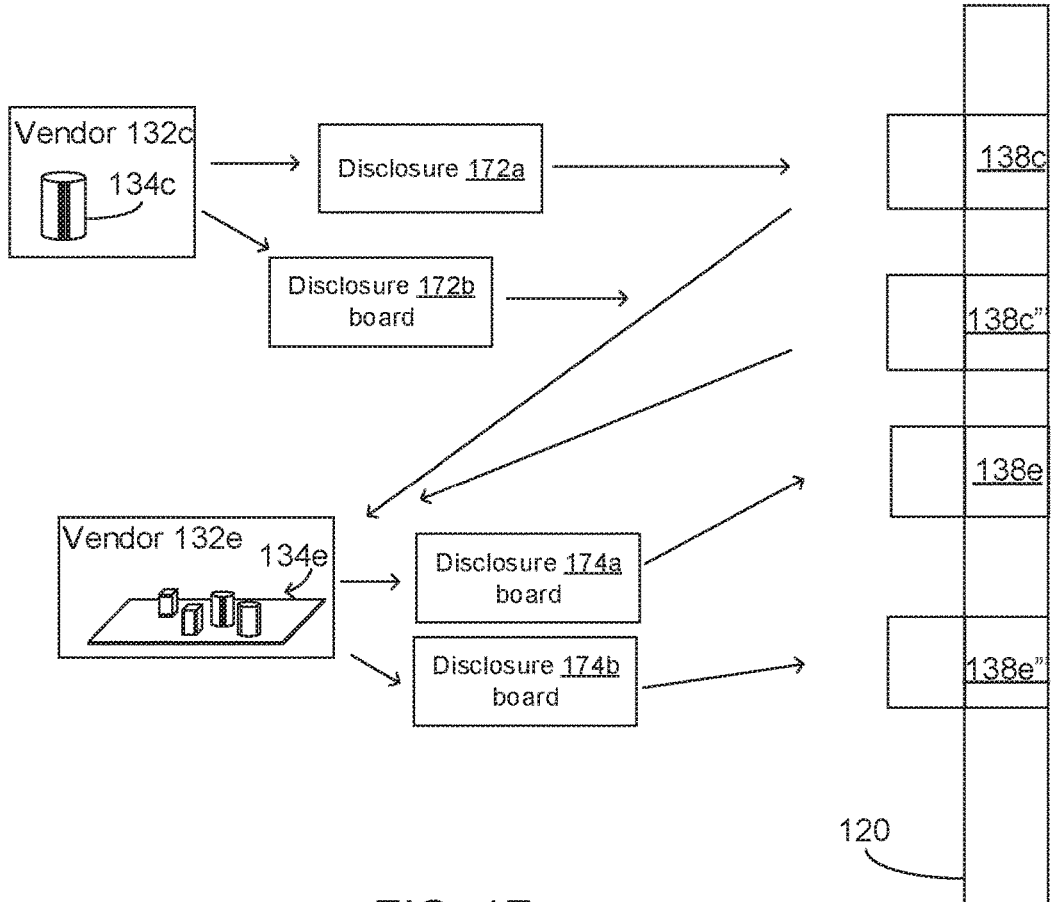
FIG. 1F illustrates another network logic diagram of generating disclosures for different purposes with a blockchain, according to example embodiments.

FIG. 1B will discuss general creation and handling of product disclosures and representative articles on a blockchain. FIGS. 1C-1D will discuss downstream representative article or product disclosure updates, and upstream material data content requests. FIG. 1E will discuss generation of a representative article. FIG. 1F will discuss use of a blockchain in providing multi-level material content data disclosure.

FIG. 1B illustrates another network diagram of a peer network that may utilize a blockchain to maintain representative articles and product disclosures according to example embodiments. FIG. 1B will be discussed with respect to the network diagram of FIG. 1A. Reference numerals of FIG. 1B that are the same as those used in FIG. 1A are the same and will not be discussed in detail.

Referring to FIG. 1B, the network diagram 130 includes vendors 132a, 132b, 132c, 132d, 132e, 132f, 132g, and 132h. These vendors may be, for example, any of the plurality of parties of FIG. 1A, for example, the parties 110a, 110b and/or 110c. Thus, the term vendor may indicate component, board, or product manufacturers, for example, within a supply chain.

Returning to FIG. 1B, each vendor may manufacture a particular component or product. For example, vendor 132a-132h may manufacture respective components, boards or products 134a-134h.

As further shown in FIG. 1B, vendors may create representative articles and/or product disclosures to disclose material content data for their product. Such disclosures may be, for example, representative articles 118a, 118b and/or 118c, or may be product disclosures 117a, 117b or 117c of FIG. 1A. Vendors 132a-132h may generate representative articles or create product disclosures for the components, boards or products 134a-134h, shown as respective disclosures 136a-136h. Each disclosure 136a-136h may be maintained at a blockchain, for example, blockchain 120 at respective blockchain channels 138a-138h. A ledger for the respective blockchain channels 138a-138h represent the state transitions (i.e., initial material data content, as well as any updates thereto) for the particular component or product maintained at that blockchain channel. The current state database for each channel represents the current material content data for the components(s)/board(s)/product of the channel.

Thus, for example, where disclosure 136a is updated (i.e., to disclose new SNs, remove SNs, or to change the amount of previously disclosed SNs), the changes are submitted as a transaction for endorsement and validation by members of the blockchain channel. If endorsed and validated (i.e., by fifty percent of channel members), the transaction is appended to the channel ledger, and the current state database for the channel represents the current material content data for the particular component/board or product. An initial representative article or product disclosure may be processed in the same way by chaincode and the smart contract for the channel as updates are, as a transaction submitted as a list of key value pairs representing SN(s) and related SN information such as amount of the SN in an article. The initial transaction may be endorsed, validated and appended to the ledger as a world state. Updated transactions may then be submitted, endorsed, validated and appended to the ledger, creating a new, current world state.

The validation/consent process for disclosure updates will be discussed below with respect to FIG. 1C, in accordance with some embodiments.

A particular vendor, for example, vendor 132e's initial representative article may have been generated using other representative articles or product disclosures, for example, provided by other vendors, i.e. vendors 132a-132d, at other blockchain channels. The other vendors at other channels (i.e. channels 138a-138d), may be governed by different smart contracts operating to generate disclosures in a similar fashion as the smart contract used for vendor 132e, where vendor 132e has permissions to access the disclosures of the other channels. In this way, the smart contract governing channel 138e may be thought of as interlocked with those of channels 138a-138d. In a similar fashion, the smart contract of channel 138f may be thought of as interlocked with the smart contracts of channels 138a and 138b, and the smart contract of channel 138g interlocked with those of 138e and 138f. Members of each blockchain channel may be, for example, the vendor of the component/board/product, as well as purchasers thereof that have an interest in the material content data provided at the blockchain channel. Endorsement, validation and blockchain transactions will be discussed below with respect to FIGS. 2A-2B and FIG. 3.

Though 138a-138h have been described as blockchain channels, they may instead represent individual blocks of the blockchain. Further, for simplicity, the channels 138a-138h have been shown as being on the blockchain 120. However, it will be appreciated that some of the channels may be a part of other blockchains in some embodiments. The disclosures 136a-136h may be generated using one or more representative articles and/or product disclosures. For example, vendor 132c, that manufactures component 134c, may utilize product disclosures from its upstream vendors when creating its disclosure. In addition or in the alternative, vendor 132c may utilize representative articles for the articles used to create the component 134c, when creating its disclosure. In addition or in the alternative, vendor 132c may generate its disclosure 136c as a representative article as discussed below with respect to FIG. 1E.

In some embodiments, the representative article, i.e. disclosure 136e, generation may occur automatically, where the computing device (i.e., computing device 111a, 111b or 111c of FIG. 1A) employs blockchain code of the smart contract for its channel to access appropriate blockchain channels to retrieve disclosures 136a, 136b, 136c and 136d. The computing device using blockchain code may compile the information, on an SN by SN basis, adding the amounts of each SN up to generate the disclosure 136e for the board 134e. The computing device may then, for example, submit the disclosure for endorsement and validation, and appending to the channel ledger for blockchain channel 138e. The initial generation of the disclosure may be endorsed and validated by the vendor 132e as the initial member of channel 138e. As downstream vendors purchase the board 134e, they are invited to join channel 138e and thus access disclosure 136e. As such, they may have input as to certain updates to the disclosure 136e posted to channel 138e by vendor 132e, as interested parties. The validation/consent process for disclosure updates will be discussed below with respect to FIG. 1C, in accordance with some embodiments.

FIG. 1C illustrates a network logic diagram for providing disclosure updates with a blockchain, in accordance with example embodiments. FIG. 1C will be discussed with respect to the network diagrams of FIGS. 1A and 1B. Elements of FIG. 1C having reference numerals that have already been used, are the same and will not be discussed in detail.

Referring to FIG. 1C, it is decided that an update to the product disclosure for electrical component 134c of vendor 132c is required, at 142. For example, vendor 132c may have altered their manufacture of component 134c, for example, utilizing a different paint color or different electrical leads, that may include different SNs or altered amount of disclosed SNs. In the alternative, an upstream vendor to vendor 132c may have altered its article used by vendor 132c in its component 134c requiring vendor 132c to update its disclosure 136c. In some aspects, the materials of the component 134c may not have changed, however vendor 132c determines that regulatory or business practices desire the disclosure of additional substances not currently disclosed within the disclosure 136c.

Thus, vendor 132c creates an updated disclosure 136c'. The updated disclosure 136c' may include additional substances, or may remove or change the amount of a substance that was previously disclosed. The updates to disclosure 136c may be submitted as a transaction for endorsement, and in some circumstances, validation. In some circumstances, the smart contract may be set up to allow the updates to be appended to the blockchain without consent, whereas in other circumstances, the smart contract may require the updates to be consented to by a percentage (i.e., 50%) of blockchain channel members. For example, where the update does not significantly or adversely alter the disclosure, the update may be appended to the blockchain without a consent requirement, whereas, where the update results in a significant or adverse change to the disclosure, consent by some percentage of the blockchain members may be required.

The determination as to what constitutes a significant or adverse change to the disclosure may be specified within the smart contract or other consent rules for the blockchain. For example, where the update results in one or more of the SNs to exceed a reporting threshold resulting in the change of reporting of the SN, or a legal threshold that causes an SN to exceed an allowable amount of an SN in the article, then consent may be required before the update is appended to the blockchain. In this example, where the update causes a particular SN (i.e., a SVHC) to exceed 0.1% weight on a weight for weight basis, or to exceed 100 parts per million (or 0.01%) for heavy metals content in packaging, where such amounts are set by a regulatory agency, the update would require consent by blockchain members before being appended to the blockchain. Similar rules may be set for voluntary type reportable data, for example, the reporting of recycled content or other eco-type substances that don't have a regulatory basis but rather are tracked within an article on a voluntary and/or sustainability initiative.

If validated, the update is appended to the channel 138c at block 138c' as updated disclosure 136c'. The current state database for channel 138c thus represents the current material data for component 134c.

As shown at 144, vendor 132e determines that an update to its disclosure 136e is necessary. For example, as vendor 132e is a member of blockchain channel 138c, vendor 132e receives the updated disclosure 136c' that has been placed on channel 138c and current state database for component 134c. Vendor 132e may determine that an update to its disclosure 136e is in order. For example, vendor 132c may have provided updated disclosure 136c' due to new regulatory disclosure requirements. As a result, those regulatory disclosure requirements may require vendor 132e to likewise update its disclosure to the disclosure 136e', accounting for the new regulatory changes. In the alternative, the updated disclosure 136c may have been as a result of an altered manufacturing process for component 134c utilizing different substances resulting in component 134c'. In this case, for example, through information provided within updated disclosure 136c', vendor 132e may determine whether an update to their disclosure 136e is necessary. For example, where vendor 132e determines through version or time/date stamp information provided within updated disclosure 136c', that vendor 132e's board 134e is using the older version 134c of the component, vendor 132e would not yet need to update its disclosure 136e. However, where vendor 132e determines, for example, through time/date and/or version information that vendor 132e is now using the altered component 134c', vendor 132e may update its disclosure to be updated disclosure 136e', and may submit the disclosure 136e' as a transaction for endorsement, validation and appending to the channel 138e at block 138e' in a similar fashion as discussed above with respect to 142.

It will be appreciated that in some embodiments, the updates to product disclosure 136e' may occur automatically. For example, a processor at the vendor 132e, for example, processor 112c discussed above with respect to FIG. 1A, may receive the updated product update 136c' from the blockchain channel 138c as a member of the channel. The processor 112c may implement chaincode to determine, using version or time/date stamp information, whether the product 134e is using the affected version of the component 134c'. If it is determined by the processor that it is using the affected version of the component 134c', chaincode of the smart contract for vendor 138e channel may implement the changes that were appended to blockchain channel 138c at block 138c', as a transaction to be endorsed, validated and appended in a similar fashion as discussed above for 142. If appended, the disclosure 136e' is added to the channel ledger for chain 138e at block 138e'.

As shown at 146, vendor 132g, as a member of vendor 132e's blockchain channel 138e, receives the updated disclosure 136e' represented as the update at block 138e'. In a similar fashion as described above for vendor 132e, vendor 132g may determine whether an update to their disclosure 136g is in order. If it is determined that an update is necessary, vendor 132 may implement changes to its disclosure 136g in a similar fashion as discussed at 142 and 144, ultimately resulting in appending the changes as an update at block 138g' of channel 138g.

Similarly, as shown at 148, vendor 132h, as a member of blockchain channel 138g receives updated disclosure 136g' represented as appended block 138g', and determines whether an updated disclosure is required for their disclosure 136h. Thus, where vendor 132h determines an updated disclosure 136h' is required, vendor 132h may generate the updated disclosure 136h' in a similar fashion as discussed above at 142, 144 and 146, where disclosure 136h' is appended at block 138h', for example, blockchain channel 138h.

FIG. 1D illustrates another network logic diagram that may be utilized for upstream material data content requests, in accordance with example embodiments. The network logic diagram of FIG. 1D will be discussed with respect to the network diagrams of FIGS. 1A-1C. Reference numerals of FIG. 1D that have been previously used are the same and will not be discussed in detail. Disclosures 136a-136h are not shown in FIG. 1D for simplicity. Vendor 132g may determine, for example, that regulatory requirements have changed with regard to disclosures of certain SNs, or have added SNs. Vendor 132g generates a product query 151g as shown at 152. Vendor 132g is a member of blockchain channels 138e and 138f, having purchased products supported by those channels.

The product query 151g may take the form of an updated disclosure similar to as discussed with updated disclosures of FIG. 1C. The updated disclosure is submitted by vendor 132g as a transaction, and includes an SN(s) that vendor 132f would like to know is present in the products 134e and 134f. The product query 151g may provide null values for the SN(s) therein. The null value for each SN of the query message 151g may be a predetermined convention indicating to the chaincode that disclosure of the SN is desired. Ordinarily, vendor 132g may not be able to post a disclosure update transaction on another vendor's blockchain channel, however, the smart contract may designate that update disclosures indicating a null value for all SNs of the disclosure be allowed. The update disclosure message of query 151g would not affect the current state of the blockchain channel to which it is appended, as the values for the SN(s) are null. The endorsement and/or consensus function of channel members may be used to weed out improper or mistaken update disclosures.

As vendor 132g utilizes boards 134e and 134f from vendors 132e and 132f, the query 151g may be submitted for endorsement, validation, and appended at channels 138e and 138f, for example, at blocks 138e" and 138f' shown in FIG. 1D. In this way, vendors 138e and 138f may be requested to disclose particular SNs of the query 151g, for example, due to changed disclosure requirements.

Vendor 132e and 132f, upon receiving the query 151g, may determine if their respective boards 134e and 134f include the requested SNs. For example, vendor 132e that utilizes components 134a, 134b, 134c and 134d in its board 134e, may retrieve the disclosures 136a, 136b, 136c, and 136d from channels 138a, 138b, 138c and 138d of which it is a member, and determine whether the requested SN is disclosed. However, vendor 134e may further generate a query 151e to blockchain channels 138a, 138b, 138c and 138d, shown at 155, for the requested SN(s) in a similar fashion as discussed with respect to the query 151g of 152. Vendor 134f may similarly retrieve disclosures 136a and 136b, and as shown at 153, generate a query 151f to blockchain channels 138a and 138b for the requested SN(s) in a similar fashion as discussed at 152.

In this case, it may be determined that the new regulations for disclosing SN(s) affect only component 134c, shown at 157. Vendor 132c may provide an updated disclosure 136c' indicating the requested SN(s), and submit the updated disclosure 136c' as a transaction in a similar fashion as discussed above at 142 of FIG. 1C. If validated, the updated disclosure 136c' is appended at blockchain channel 138c at block 138c'. The updated disclosure may then propagate downstream to vendors 138e and 138g as shown at 158 and 159, in a similar fashion as discussed above with respect to 144, 146 and 148 of FIG. 1C.

In this case, vendor 132f is unaffected by the changed regulations, as the components 134a and 134b are unaffected. Vendors 132a and 132b may indicate this through some understood convention, for example, by implementing a transaction for an update message as a response 151a and 151b, to their respective blockchain channels 138a and 138b at blocks 138a" and 138b" respectively. The query response message 151a and 151b may be in some predetermined convention, for example, including the requested SN(s), a null value (or some predetermined unrealistic value for the SN), and/or some other indication that none of the requested SN(s) are present in their respective components 134a or 134b. The smart contracts of the blockchain channels 138a and 138b would be sufficiently configured to allow the update disclosure message response, while not accounting for the response in the channel current state database representing the current respective disclosures 136a and 136b. The response messages 151a and 151b appended at 138a" and 138b" indicate to vendor 132f that no update is required for disclosure 136f.

Thus, the response to a query such as query 151e, 151f or 151g may be an updated product disclosure, for example, disclosure 136c' and 136e', and/or may be a query response, for example, 151a or 151b.

FIG. 1E illustrates another network diagram showing the generation of a representative article, in accordance with example embodiments. FIG. 1E will be discussed with respect to the network diagrams of FIGS. 1A and 1B discussed above. As shown in FIG. 1E, network diagram 160 shows a vendor 132e that may utilize, for example, computing device 110a as discussed above.

Vendor 132e may manufacture the circuit board 134e that includes components 134a, 134b, 134c and 134d. Accordingly, vendor 132e must account and include disclosure information for its components, including the disclosures 136a, 136b, 136c and 136d when generating its disclosure 136e. However, vendor 132e may have determined that the component 134d may have comparable components 162a or 163a that may have the same form, fit and function as component 134d, and may thus be used in its place.

In creating its disclosure, vendor 132e may generate a representative article, for example, representative articles 165a, 166a or 167, to account for use of 134d, 162a or 162b in its board 134e. Vendor 134e may retrieve the disclosure 136d from blockchain channel 138d (i.e. as the current state database values for channel 138d), and may likewise retrieve disclosure 162b from blockchain channel 164a. However, no vendor-created product disclosure for component 163a is available. Accordingly, vendor 132e conducts or commissions a lab chemical composition analysis of the component 163a to determine its makeup. The substance makeup may be a complete substance determination, or may indicate SNs within the product 163a. A component 163a disclosure 163b is then generated as a representative article for component 163a. In the alternative, an industry survey may be conducted, where manufacturers are surveyed as to the presence of certain SNs and the amount thereof in the makeup of their components comparable to the component 163a. In this case, the survey results may be used, for example, providing a worst case for each SN and amount identified from the survey. The survey results may then be used to generate representative article 163b. In another alternative, where another party commissioned a lab analysis or industry survey for component 163a, and provided it as a representative article 163b at blockchannel 164b, the vendor 134e may retrieve the representative article 163b from the blockchain channel 164b.

The disclosure 136d may indicate an SN, the weight of the SN, the percentage makeup of the SN in the article and whether the threshold is reached requiring reporting for the particular SN, at 163a, 163b, 163c, 163d and 163e, respectively. For example, as shown at 163f, SN1 is identified with a weight of 0.01 g, an article weight of 50 g, a percentage of 0.02 and is indicated as not reported. Similar information is provided for SN2, SN3 and SN4 present in component 134d, as shown at 163g, 163h and 163i. It will be noted, that the article weight column 163c does not necessarily represent the weight of the article 134d. Rather, the article weight may represent the weight of a particular subcomponent. For example, the rows 163f and 163g may represent an article weight of, for example, capacitor electrical leads of 134d, whereas the article weight shown in row 163h may represent the weight of the capacitor skin, and the article weight shown in row 163i may be for the component 134d dielectric insulator.

The disclosure 162b includes similar information for SN1, SN2, SN3 and SN4, shown at rows 163j, 163k, 163m and 163n, respectively. Similar information is provided for the representative article that represents comparable component 163a at disclosure 163b, for SN1, SN2, SN3 and SN4 at rows 163p, 163q, 163r and 163s, respectively.

The disclosures 136d, and comparable component disclosures 162b and 163b may be used to determine a representative article for the space at board 134e where the component 134d is used. The representative article may be as shown as a "worst case" scenario at 165a, a weighted average at 166a, or may account for a safety factor as shown at 167. Business concerns may determine the manner of determining the representative article. The representative article may then be used in the creation of the product disclosure 136e for the board 134e. Thus, regardless of whether component 134d, component 162a or component 163a are used in the board 134e, the product disclosure 163e, utilizing a representative article for the components 134d, 162a and 163a will remain substantially accurate for regulatory disclosure purposes should a substitution occur, without a need to update the product disclosure 136e.

The representative article 165a may be determined by determining the highest level of each substance present in the comparable components it represents. For example, the comparable components 134d, 162a and 163a include SN1, SN2, SN3 and SN4. The highest level of SN1 from the disclosures 136d, 162b and 163b for the three comparable components 134d, 162a and 163a, respectively, is 0.01 g, and thus represents the worst case amount for SN1 in the three comparable components. Thus, the representative article 165a shows SN1 with a weight of 0.01 g, as shown at 165b. The highest amount of SN2 from the disclosures 136d, 162b and 163b is 0.15 from row 163q of disclosure 163b, and thus is the worst case amount for SN2 for any of the three comparable components. SN2 is then represented in the representative article 165a with a value of 0.15 g, as shown at 165c. Similar decisions are made for SN3 and SN4 and listed in their worst case amounts as shown at 165d and 165e, respectively. The representative article 165a percent thresholds may again be determined, and a decision as to whether the thresholds meet a reportable threshold is indicated at the representative article as well. Thus, the worst case representative article 165a may represent a disclosure for comparable components 134d, 162a and 163a, that allows the disclosure 136e relying thereon to remain accurate for regulatory disclosure purposes should a substitution take place. Though not shown, reporting thresholds for SNs may be provided, maintained and updated for disclosures at the blockchain in a similar fashion as for SNs, for use by the chaincode in determining whether particular SN amounts require reporting. Such thresholds may be maintained and updated, for example, through some predetermined convention within a disclosure update as additional information provided for an SN. In the alternative, the threshold information may be maintained at a computing device/network of the vendor/manufacturer, where only the determination as to whether the particular SN exceeds threshold requirements is maintained at the blockchain.

Instead of a worst case scenario for SNs being used to create a representative article, a weighted average approach may instead be used, as shown at 166a. In this case, a weighting factor may be utilized representing the frequency that a particular comparable component may be used in the product, such as the board 134e. For example, the weighting factor for a comparable component may represent the percentage of stock in inventory for each comparable component.

Returning to FIG. 1E, weighting factors for this example embodiment may be provided for each comparable disclosure 136d, 162b and 163b, at 169a, 169b and 169c respectively. Thus, the weighting factor 169a indicates that 90% of the stock for the comparable components is the component 136d. As shown at 169b, 5% of the stock is component 162a, and at 169c, 5% of the stock is component 163a.

When calculating the weighted average for each SN, the amount for the SN is a sum of the product of the SN in each disclosure with its corresponding weighting factor. Thus, the amount of SN1 would be the sum of WF169a* (the amount of SN1 from row 163f), WF169b* (the amount of SN2 from row 163j) and WF169c* (the amount of SN1 from row 163p). The resulting value for SN1 is shown at row 166b for weighted Avg. representative article 166a. A weighted average article weight may similarly be calculated for SN1 in a similar fashion as for SN weight, allowing a weighted average percentage to be determined for the SN1 of 166a. It may then be determined whether the weighted average for the SN, for example SN1, meets the threshold for reporting. The weighted averages may be computed for rows 166c, 166d and 166e in a similar fashion. Thus, weighted average values for SN1, SN2, SN3 and SN4 from the comparable disclosures 136d, 162b and 163b are shown at rows 166b, 166c, 166d and 166e of weighted average representative article 166a.

As shown at 167, a representative article may include a safety factor. For example, each SN value of the worst case representative article 165a may be multiplied by a safety factor, for example, 10% (i.e., take the value and multiply it by 1.10), to ensure that adequate disclosure of the SNs disclosed are adequately represented in the representative article. Instead, each SN value of the weighted average representative article 166a may be calculated with a safety factor, for example, 10%, to ensure that adequate disclosure for the SNs of the weighted average representative article 166a are adequately represented in the representative article. A similar safety factor may be provided and utilized when determining the representative article for a missing disclosure, for example, the disclosure 163b.

Thus, when generating the disclosure 136e, a representative article may be utilized to account for all three possibilities of 134d, 162a or 163a being used in the board 134e, such that substitutions don't affect the accuracy of the disclosure 136e for the board 134e. The disclosure 136e may thus be generated using disclosures for components 134a, 134b and 134c, as well as the representative article generated for comparable components 134d, 162a and 163a. The means used to generate the representative article, for example, as worst case 165a, weighted average 166a and/or accounting for a safety factor 167 may be based on business practices or regulatory considerations. Not shown, a disclosure may further indicate the means used to determine a representative article used to create the disclosure.

The product disclosure 136e may then be submitted as a transaction to the blockchain channel 138e, for example, in a similar fashion as discussed above for 142 of FIG. 1C, endorsed, validated and appended at a blockchain, for example, at channel 138e at block 138e'.

The representative article may be determined automatically, for example, utilizing a computing device, for example, the computing device 111a, 111b or 111c of FIG. 1A. A processor, such as the processor 112a, 112b or 112c may implement chaincode of a smart contract to retrieve disclosures for comparable components from various blockchains or blockchain channels, for which the computing device is a member. The retrieved disclosures may be stored, for example, as product disclosures 117b. The processor may implement chaincode to determine the various SNs and amounts from each retrieved disclosure, and automatically calculate representative weights for each SN, using the techniques discussed for representative articles 165a or 166a. A safety factor may be accounted for, for example, as discussed with respect to 167. The newly calculated amounts (i.e., representative amounts) for each SN may then be saved as a representative article at representative articles 118b. The storing of the representative article at 118b may occur, for example, through the transaction, endorsement and validation discussed above to append the representative article to the blockchain channel ledger, for example, at blockchain channel 138e.

It will be appreciated, that where multiple components of a product may be substituted-out with comparable components, a representative article may be generated for each component that may be substituted as described above, and used in creating the disclosure, thereby representing many permutations of substituted components that could occur. Conventionally, product disclosures for each permutation would need to be created and maintained.

FIG. 1F illustrates another network diagram showing the generation of disclosures for different purposes, in accordance with example embodiments. For example, a disclosure may be generated for one regulatory commission of a first country, and a second disclosure may be generated for a regulatory commission in a different country. In another case, one disclosure may be generated for a regulatory commission, where another disclosure is generated for internal business purposes only. The network diagram of FIG. 1F will be discussed in conjunction with the network diagrams of FIGS. 1A and 1B discussed above. Elements of FIG. 1F having reference numerals already used are the same and will not be discussed in detail.

As shown in the network diagram 170, the vendor 132c may maintain disclosures depending on the country to which a product may be distributed. For example, a first country may require different substance disclosures than a second country. Thus, vendor 132c may generate the disclosure 172a for use in the first country, thereby disclosing SNs accounting for reporting thresholds for the first country. The vendor 132c may generate a disclosure for their component 134c for the second country as a disclosure 172b, accounting for the second country's disclosure requirements. The disclosure 172a may be submitted to the channel 138c of the blockchain 120 as shown, and the disclosure 172b may be submitted within the blockchain channel 138c''' of the blockchain 120. In the alternative, both disclosures 172a and 172b may be submitted to a single blockchain channel, for example, 138c, and differentiated by using a different part number, version number, and/or country code designated within the disclosure. In the later case, a channel ledger may be provided as an array providing current disclosure information for each disclosure 172a and 172b.

When vendor 132e purchases the part 134c from the vendor 132c, vendor 132c may note the country of location for vendor 132*e*, and provide access to the appropriate blockchain channel, for example, 138*c* or 138*c'''* to the vendor 132*e*. In the alternative, where both disclosures 172*a* and 172*b* are located on the same blockchain channel, for example, 138*c*, the vendor 132*c* may provide the appropriate disclosure 172*a* or 172*b* corresponding with the appropriate part number, version number, or country code for the country appropriate for vendor 132*e*.

Vendor 132*e*, upon receipt of the disclosure 172*a* or 172*b* may then accurately generate its own disclosure for the circuit board 134*e* as a disclosure 174*a*, submitting that disclosure for appending to its blockchain channel 138*e*. Vendor 132*e*, like vendor 132*c*, may distribute the circuit board 134*e* in multiple jurisdictions having different regulatory requirements. Accordingly, vendor 132*e* may also generate a second disclosure, for example, disclosure 174*b* for the circuit board 134*e*, accounting for the different jurisdictional regulatory requirements. The disclosure 174*b* may be submitted to the blockchain, for example, at blockchain channel 138*e'''*. In a similar fashion as discussed above, the vendor 132*e* may instead submit both disclosures 174*a* and 174*b* to a common blockchain channel, for example the blockchain channel 138*e*.

Although the dual disclosures 172*a*, 172*b* and 174*a*, 174*b* have been discussed with relation to referring regulatory requirements, it will be appreciated that one of the disclosure may be for regulatory requirements whereas the other may be for internal business purposes. Thus, the disclosure 172*a* may be a disclosure that represents only the SNs for the product 134*c*. The second disclosure 172*b* may be a disclosure that includes proprietary information for the substance 134*c*, and/or a complete substance disclosure for the component 134*c* that is maintained for internal business purposes. Thus, the disclosure 172*a* may be stored at a blockchain channel 138*c*, that allows open access, or permissioned access to vendors of the product, whereas the disclosure 172*b* may be disclosed at the blockchain 138*c'''*, where members of the channel 138*c'''* are all located within the vendor 132*c* company. It will be appreciated that a similar dual-disclosure for regulatory and business purposes may be implemented for the disclosures 174*a* and 174*b*.

Disclosures 172*a* 172*b*, 174*a* and 174*b* may be representative articles, for example, generated as discussed above with respect to FIG. 1E. The representative articles may account for the jurisdiction reporting requirements for which they are being created.

Figure 2A:
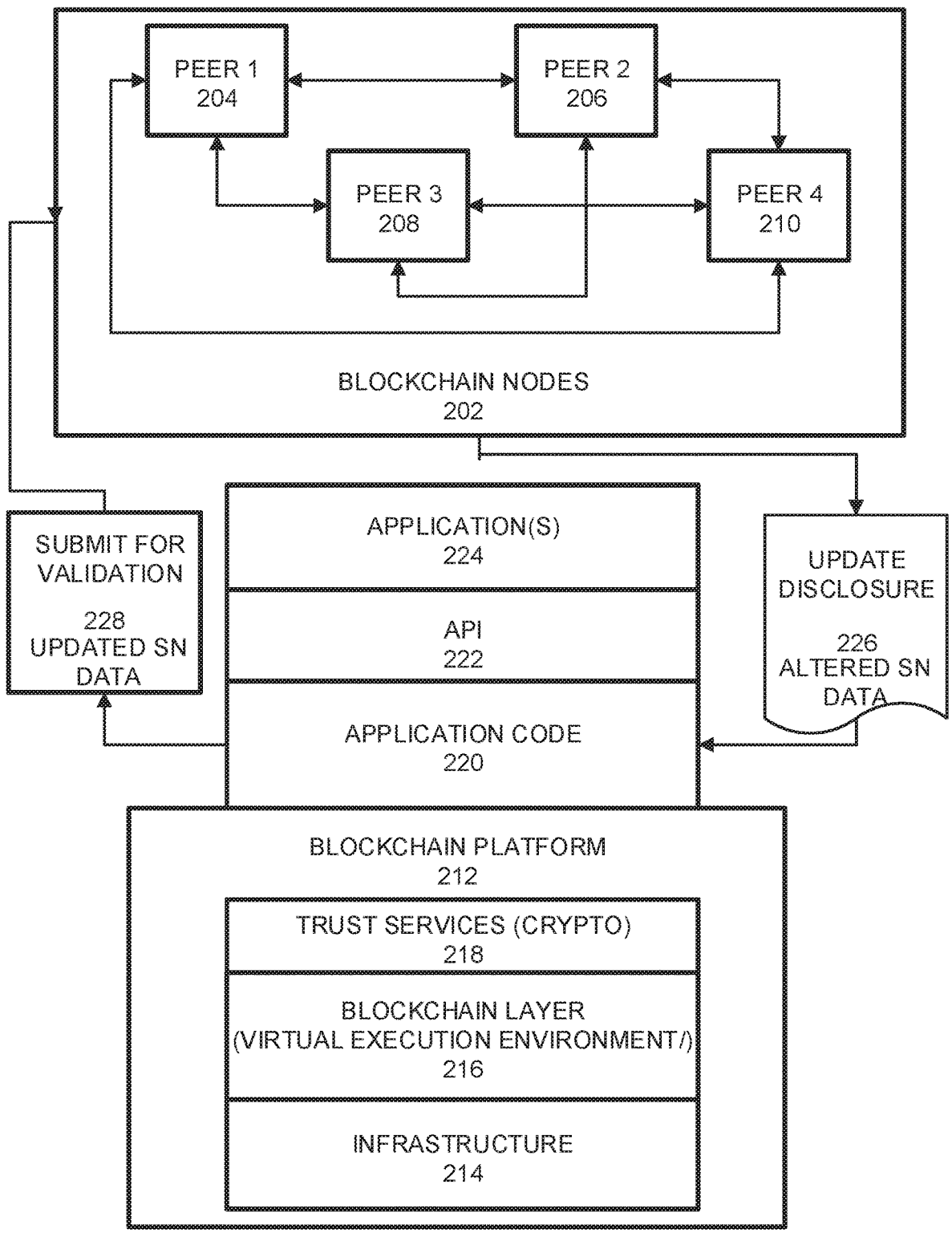
FIG. 2A illustrates an example peer node blockchain architecture configuration for an asset sharing scenario, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, information 226 may include disclosure update information such as SNs and corresponding amount information that may be processed by one or more processing entities (e.g., virtual machines) included in the blockchain layer 216. Updated SN information may include altered SN reporting threshold information in some embodiments. The result 228 may include updated product disclosure information, for example, resulting from the addition, subtraction or altering values for SNs, as well as generation of any percentage composition, and determinations as to whether new SN values or percents trigger disclosure thresholds. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, one function may be to update product disclosure information, for example, updating SN and SN values through the addition of SNs, subtraction of SNs or altering the value of an SN already present in the disclosure, as well as determining whether new SN values trigger disclosure thresholds. The updated product disclosure data of 226 may be used to determine new SN values for the product disclosure, as well as determinations as to whether the new SN values trigger disclosure requirements, which may be provided to one or more of the nodes 204-210 for validation.

Figure 2B:
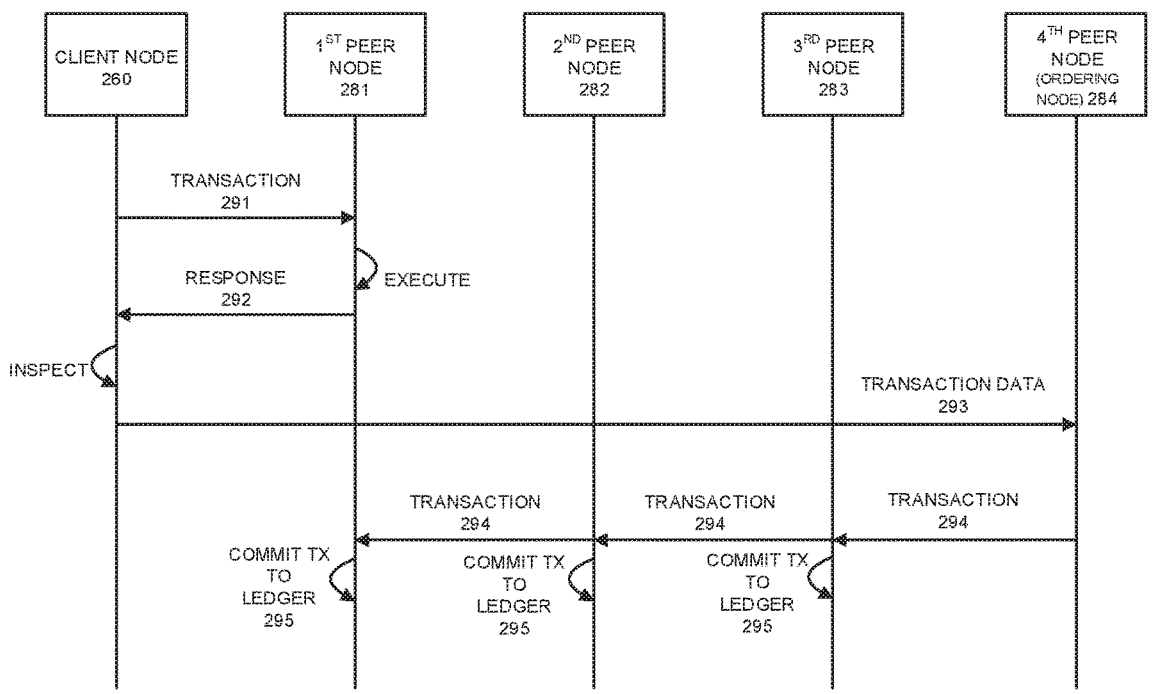
FIG. 2B illustrates an example peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
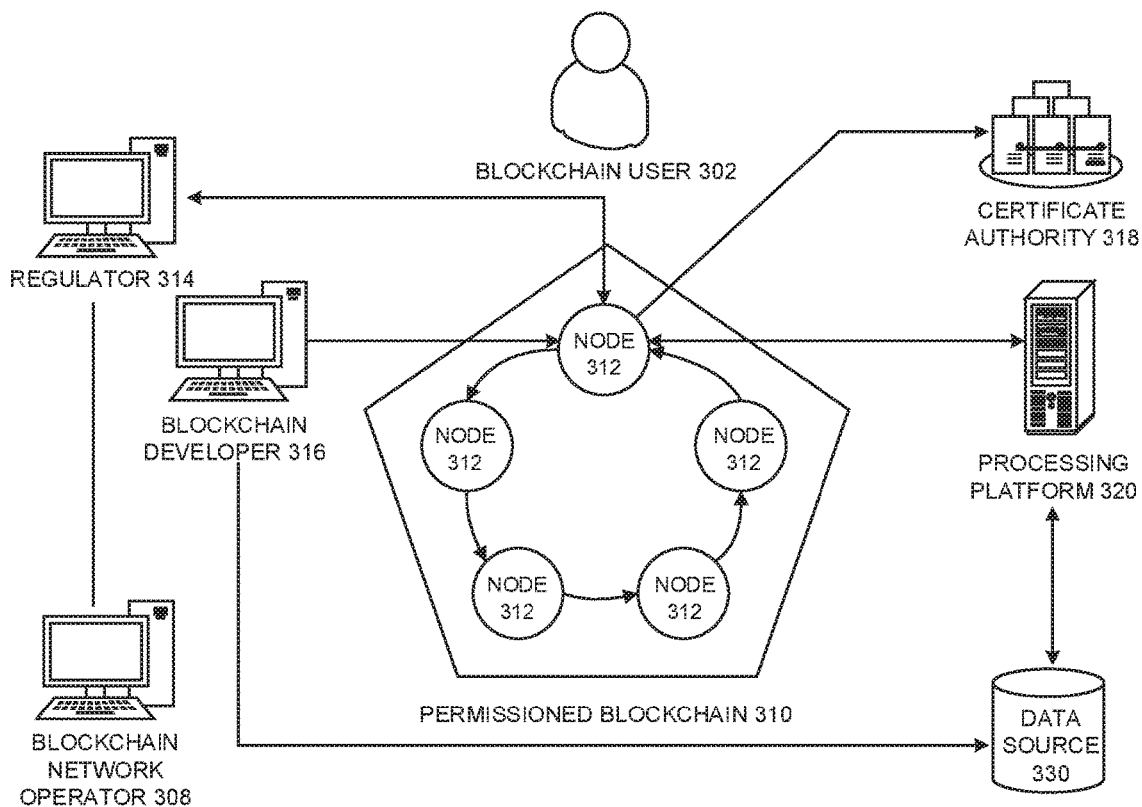
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
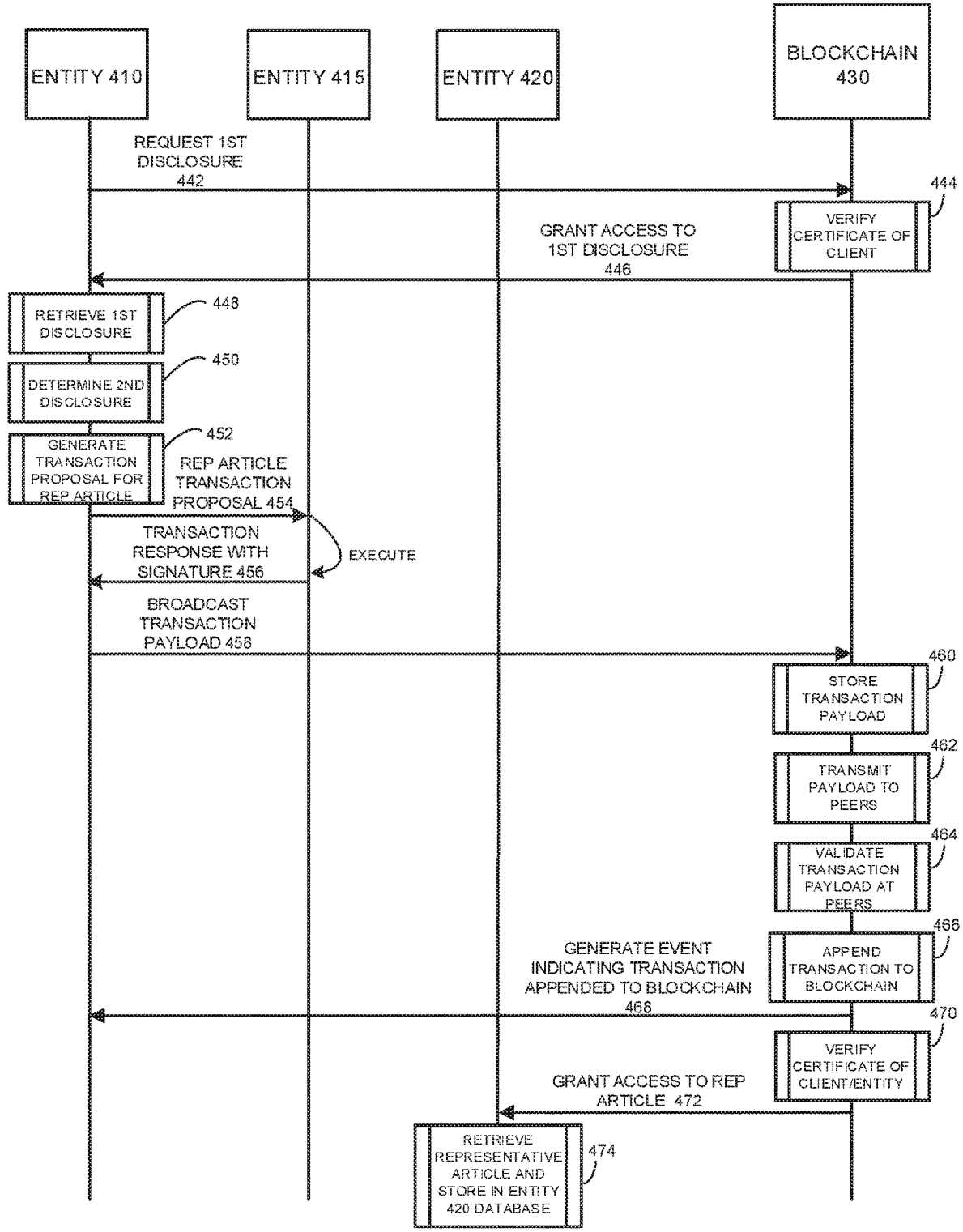
FIG. 4 illustrates a system messaging diagram for generating a representative article, according to example embodiments.

FIG. 4 illustrates a system messaging diagram for performing generation of a representative article, according to example embodiments. The system messaging diagram of FIG. 4 will be discussed with respect to the networks of FIGS. 1A-1E. Referring to FIG. 4, the system diagram 400 includes an entity 410, an entity 415 and an entity 420, communicatively coupled with blockchain 430. Entities 410, 415 and 420 may be peers within a peer network, that may be members of the blockchain 430.

As shown at 442, a first disclosure is requested from the blockchain, for example, a first channel of the blockchain. The blockchain 430 verifies the certificate of entity 410 at 444, for example, ensuring that entity has appropriate permissions through the smart contract to access the blockchain channel maintaining the first disclosure. As discussed above with respect to FIGS. 1A-1E, the first disclosure may be a product disclosure, or may be a representative article for a component from which material content data is desired to generate a representative article. Access is granted as shown at 446, and the first disclosure is retrieved at 448. The first disclosure retrieval may be, for example, the current state database of the first blockchain channel.

A second disclosure may be determined at entity 410, as shown at 450. The second disclosure may be determined, by retrieving the disclosure as a product disclosure from the first blockchain channel of the blockchain channel maintaining the first disclosure, or another channel of the blockchain 430, or from a different blockchain (not shown). The second disclosure may be a product disclosure or a representative article, including material content data desired for generation of the representative article. The second disclosure may have been generated in a similar fashion as discussed above with respect to FIG. 1E for representative articles 163*b*, 165*a*, 166*a* or 167.

A transactional proposal is prepared for a representative article at entity 410, as shown at 452. This transaction proposal may be generated, for example, using chaincode of a smart contract for the blockchain for a second channel of the blockchain 430. The transaction proposal key value pairs at 452 may be determined for the representative article being generated, for example, in a similar fashion as discussed above with respect to generation of the representative articles 163*b*, 165*a*, 166*a* or 167 as described above with respect to FIG. 1E. The representative article transaction proposal key value pairs may be a bill of material for SNs and amounts for each SN, as well as any other desired SN related information (i.e., article weight, percentage, reportable threshold, reportable threshold reached information, etc) submitted. The representative article is transmitted to entity 415 for endorsement as a transaction proposal, as shown at 454.

The entity 415 verifies the entity 410 signature, and executes the chaincode to initiate the transaction. The output may include chaincode results, the read set of key/values, and the write set of key/values written in chaincode with an endorsement signature. The output transaction response is sent at 456 to the entity 410, that packages the output with the endorsement signature as a transaction payload, broadcasting the transaction payload 458 to peers of the blockchain 430 (i.e., of the second channel). The transaction payload is stored 460 at the second channel of the blockchain 430, and transmitted to the peers 462. At 464, each peer decides whether to validate the transaction. For example, each peer may implement blockchain code to the received read set of the transaction payload, to determine if the results generated at the peer agree with the write set received. Each peer may then validate 464 the transaction payload, for example, in a fashion as discussed above with respect to 142 of FIG. 1C. When the requisite number of peers have validated 464 the transaction payload (i.e., fifty percent), the transaction (i.e., here, the transaction representing the representative article) may be appended to the blockchain 466, by each peer appending the transaction to the blockchain (or channel) ledger. The current state database then reflects the current state of the representative article (i.e., the current material content data makeup).

An event indicating that the transaction was appended to the blockchain 430 may be sent to the entity 410, as shown at 468. An entity certificate, for example for entity 420, may be verified 470, granting 472 access of the representative article to the entity 420. The entity may then retrieve and store at 474 the representative article in the entity 420 database. Updates to the representative article may be made in a similar fashion, for example, beginning at 452. The transaction proposal for the update to the representative may be as key/value pairs, indicating, for example, SNs and related SN information to be added, subtracted and/or for which an amount must be altered.

Figure 5A:
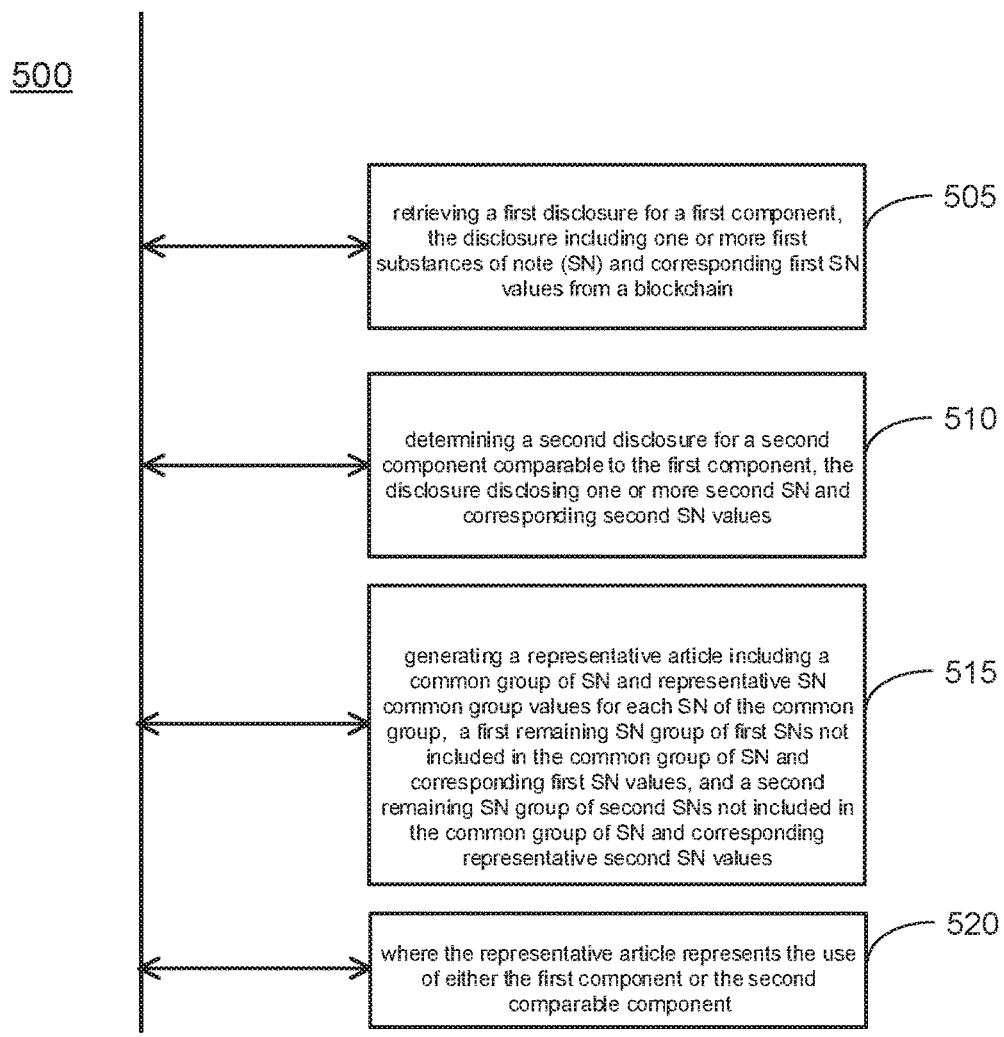
FIG. 5A illustrates a flow diagram of an example method of generating a representative article with a blockchain, according to example embodiments.

FIG. 5A illustrates a flow diagram 500 of an example method of generating a representative article with a blockchain, according to example embodiments. The flow diagram of FIG. 5A will be discussed with respect to the network diagram of FIG. 1E. Referring to FIG. 5A, the method 500 may include one or more of retrieving a first disclosure for a first component, the disclosure including one or more first substances of note (SN) and corresponding first SN values from a blockchain, as shown at step 505. The retrieving the first disclosure may be accomplished, for example, in a similar fashion as discussed above with respect to the Network logic diagram of FIG. 1E. A disclosure may be retrieved, for example, in a fashion similar to the retrieving of disclosure 134*d* as discussed above with respect to FIG. 1E.

A second disclosure is determined for a second component comparable to the first component, including one or more second SN and corresponding second SN values, as shown at step 510. The second disclosure may be determined through retrieval of the disclosure from the blockchain, for example, in a similar fashion as the retrieving the disclosure 162*b* of FIG. 1E. Instead, the second disclosure may be determined from a representative article, for example, the determining of the representative article for the second comparable component in a fashion as discussed above with respect to determining disclosure 162b, 165a, 166a or 167 of FIG. 1E.

A representative article is generated as shown at step 515, including a common group of SN and representative SN common group values for each SN of the common group, a first remaining SN group of first SNs not included in the common group of SN and corresponding first SN values, and a second remaining SN group of second SNs not included in the common group of SN and corresponding representative second SN values.

The representative article may be generated at step 515 in an example embodiment, as a worst case scenario in the fashion discussed above with respect to the generation of the worst case representative article 165a of FIG. 1E. For example, where the first and second components have common SNs, the SNs are included in the representative article as having the highest value for the SN from first or second component disclosure. The SNs of the first disclosure not common to the group are included having their corresponding SN value from the first disclosure. The SNs of the second disclosure not common to the group are included in the representative article having their corresponding values from the second disclosure.

The representative article may be generated at step 515 in an example embodiment, as a weighted average scenario in a similar fashion as discussed above with respect to weighted average representative article 166a of FIG. 1E. In this example embodiment, a weighting factor for the first component and second component are provided, where the amount for each SN of the first and second products are represented in the representative by its respective weighting factor. Thus, the value for each SN from the first disclosure is multiplied by the first weighting factor, and added to the corresponding value of each SN of the second disclosure multiplied by the second weighting factor, thereby generating the SN values for each SN of the representative value.

As shown at step 520, the representative article represents the use of either the first component or the second comparable component.

Figure 5B:
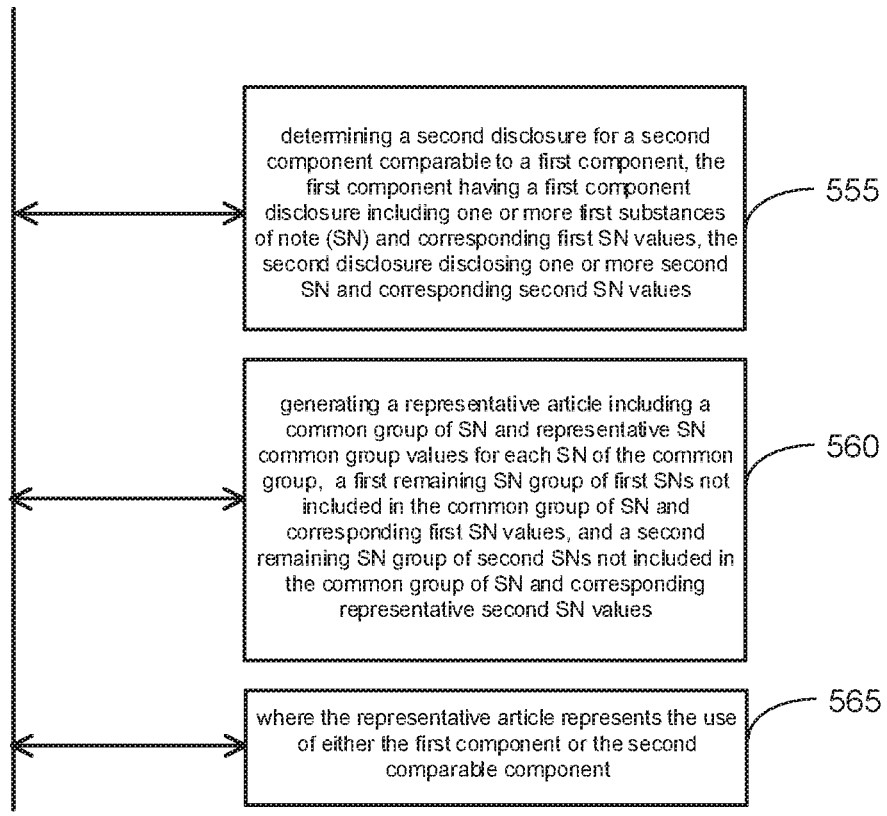
FIG. 5B illustrates a flow diagram of an example method of generating a representative article with a blockchain, according to example embodiments.

FIG. 5B illustrates a flow diagram 550 of an example method of determining a representative article, according to example embodiments. The flow diagram of FIG. 5B will be discussed with respect to the network diagram of FIG. 1E. Referring to FIG. 5B, the method 550 may also include one or more of determining a second disclosure for a second component comparable to a first component, the first component having a first component disclosure including one or more first substances of note (SN) and corresponding first SN values, the second disclosure disclosing one or more second SN and corresponding second SN values, as shown at step 555. The second disclosure may be determined through retrieval of the disclosure from the blockchain, for example, in a similar fashion as the retrieving the disclosure 162b of FIG. 1E. Instead, the second disclosure may be determined as a representative article, for example, the determining of the representative article for the second comparable component in a fashion as discussed above with respect to determining disclosure 162b, 165a, 166a or 167 of FIG. 1E.

A representative article is generated as shown at step 560, including a common group of SN and representative SN common group values for each SN of the common group, a first remaining SN group of first SNs not included in the common group of SN and corresponding first SN values, and a second remaining SN group of second SNs not included in the common group of SN and corresponding representative second SN values.

The representative article may be generated at step 560 in an example embodiment, as a worst case scenario in the fashion discussed above with respect to the generation of the worst case representative article 165a of FIG. 1E. The representative article may be generated at step 560 in an example embodiment, as a weighted average scenario in the fashion discussed above with respect to the generation of the weighted average representative article 166a of FIG. 1E. The representative article may be generated at step 560 in an example embodiment, accounting for a safety factor, in the fashion discussed above with respect to the generation of the safety factor representative article 167 of FIG. 1E.

As shown at step 565, the representative article represents the use of either the first component or the second comparable component.

Figure 6A:
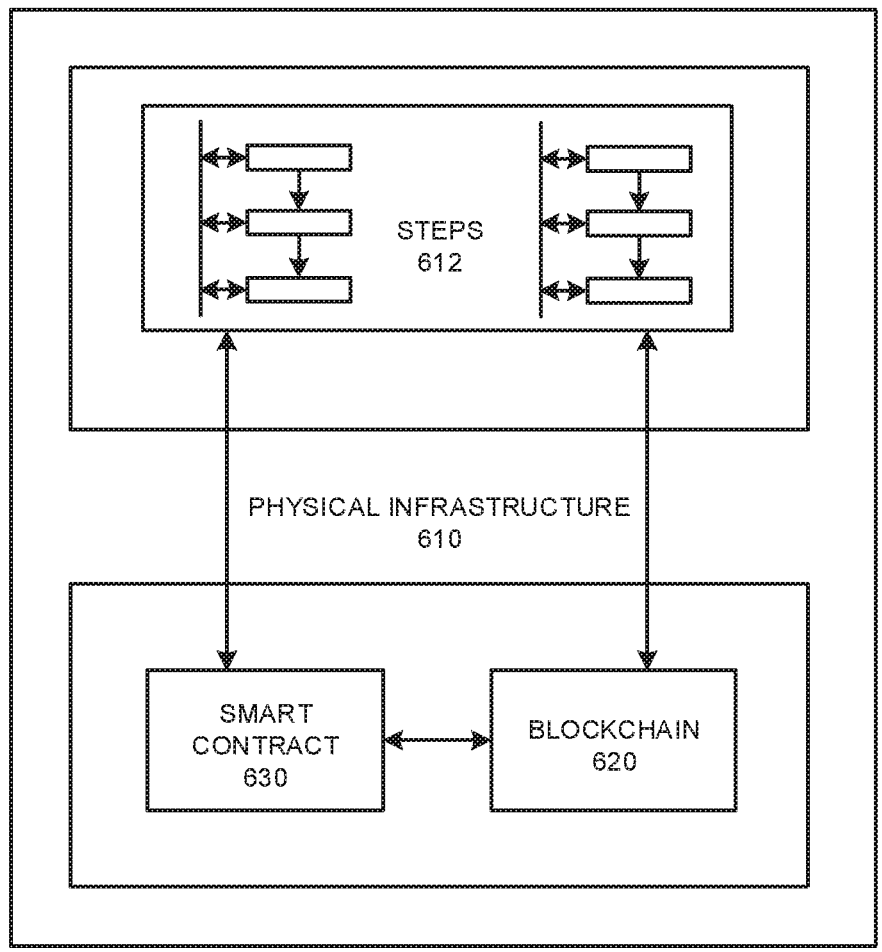
FIG. 6A illustrates an example physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 630, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 630 and/or blockchains 620 that reside on the physical infrastructure 610 of a computer system configuration. The data can be output from an executed smart contract 630 and/or blockchain 620. The physical infrastructure 610 may include one or more computers, servers, processors, memories, and/or wireless communication devices.

Figure 6B:
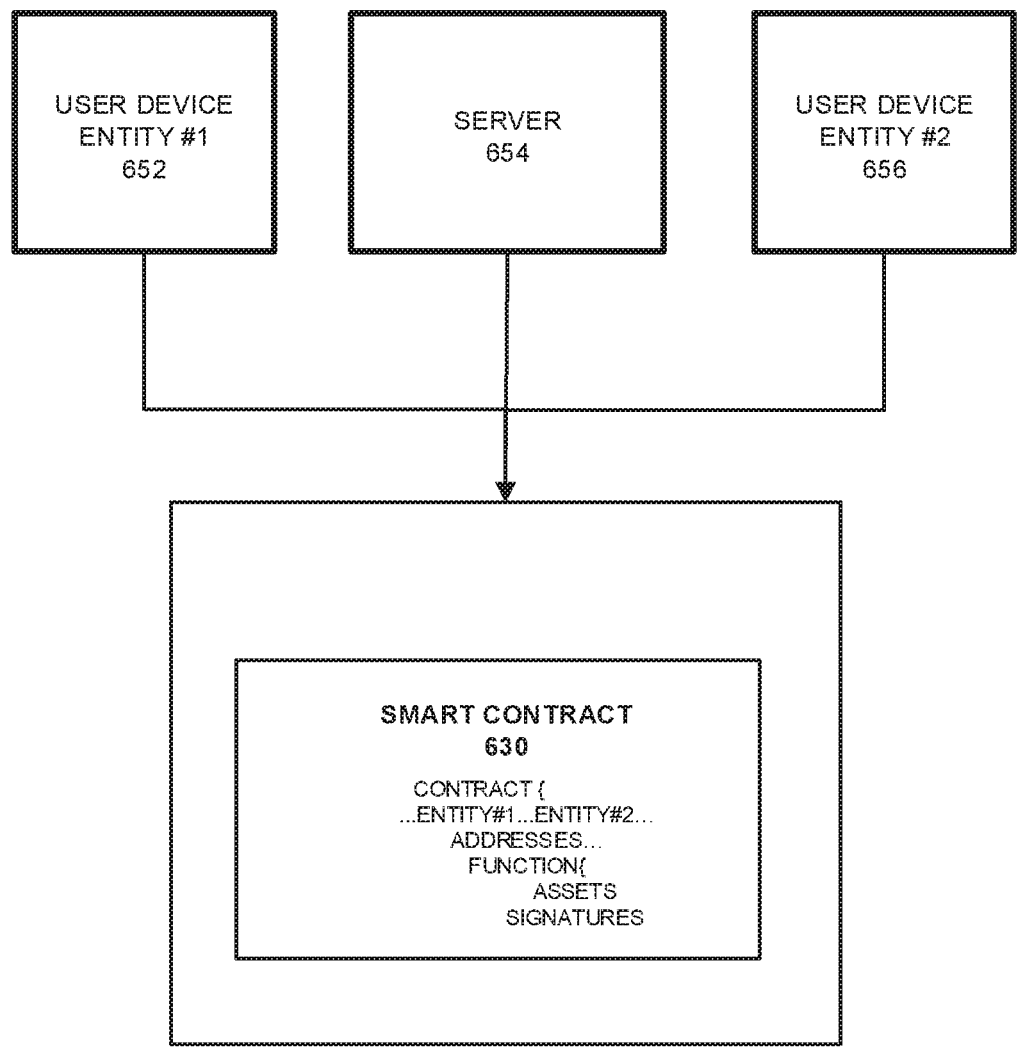
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
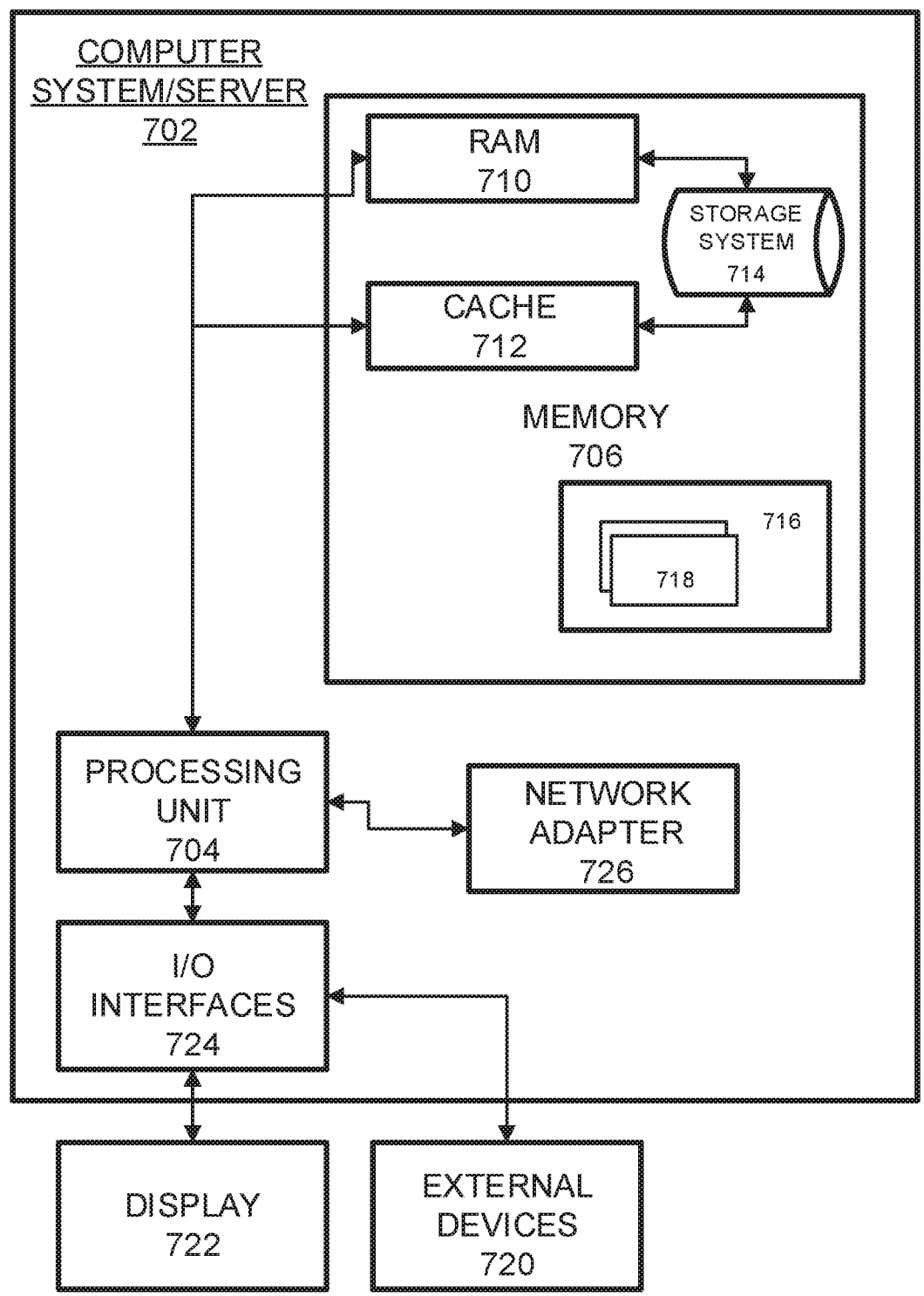
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   retrieving a first disclosure of a first component from a blockchain, the first disclosure being added to the blockchain by a first vendor;
   determining a second disclosure for a second component to be included in an article with the first component, the second disclosure being determined by a second vendor;
   generating a representative article of the article which includes the first disclosure, the second disclosure, and at least one substitute disclosure of a comparable component that can be used to replace one of the first component and the second component; and
   storing the representative article including the at least one substitute disclosure on the blockchain;
   wherein the generating is performed via smart contract logic of the blockchain.

2. The method of claim 1, wherein the first disclosure includes a description of a substance of note and a value for the substance of note included in the first component, and the at least one substitute disclosure includes the description of the substance of note and a different value for the substance of note included in the comparable component.

3. The method of claim 1, further comprising receiving an update from the first vendor indicating that the first disclosure of the first component has changed.

4. The method of claim 3, further comprising updating the representative article in response to an update to a substance of note included in the first disclosure being determined to materially alter the article, and storing the updated representative article on the blockchain.

5. The method of claim 1, wherein the generating the representative article includes accounting for a safety factor for a substance of note of the representative article.

6. The method of claim 1, further comprising validating substances of note included in the article prior to storing the representative article on the blockchain.

7. The method of claim 1, wherein the comparable component comprises a worst case component for use in the article.

8. A system comprising:
   a hardware processor configured to:
      retrieve a first disclosure of a first component from a blockchain, the first disclosure being added to the blockchain by a first vendor, determine a second disclosure for a second component to be included in an article with the first component, the second disclosure being determined by a second vendor, generate a representative article of the article which includes the first disclosure, the second disclosure, and at least one substitute disclosure of a comparable component that can be used to replace one of the first component and the second component; and storing the representative article including the at least one substitute disclosure on the blockchain wherein the hardware processor is configured to generate the representative article via smart contract logic of the blockchain.

9. The system of claim 8, wherein the first disclosure includes a description of a substance of note and a value for the substance of note included in the first component, and the at least one substitute disclosure includes the description of the substance of note and a different value for the substance of note included in the comparable component.

10. The system of claim 8, wherein the processor is further configured to receive an update from the first vendor indicating that the first disclosure of the first component has changed.

11. The system of claim 10, wherein the processor is further configured to update the representative article in response to an update to a substance of note included in the first disclosure being determined to materially alter the article, and store the updated representative article on the blockchain.

12. The method of claim 8, where the processor is configured to generate the representative article to account for a safety factor for a substance of note included in the representative article.

13. The system of claim 8, wherein the processor is further configured to validate substances of note included in the article prior to storing the representative article on the blockchain.

14. A non-transitory computer readable medium comprising
instructions which when executed by a processor cause a computer to perform a method comprising:
retrieving a first disclosure of a first component from a blockchain, the first disclosure being added to the blockchain by a first vendor;
determining a second disclosure for a second component to be included in an article with the first component, the second disclosure being determined by a second vendor;
generating a representative article of the article which includes the first disclosure, the second disclosure, and at least one substitute disclosure of a comparable component that can be used to replace one of the first component and the second component; and
storing the representative article including the at least one substitute disclosure on the blockchain;
wherein the generating is performed via smart contract logic of the blockchain.

15. The non-transitory computer readable storage medium of claim 14, wherein the first disclosure includes a description of a substance of note and a value for the substance of note included in the first component, and the at least one substitute disclosure includes the description of the substance of note and a different value for the substance of note included in the comparable component.

16. The non-transitory computer readable storage medium of claim 14, wherein the method further comprises receiving an update from the first vendor indicating that the first disclosure of the first component has changed.

17. The non-transitory computer readable storage medium of claim 16, wherein the method further comprises updating the representative article in response to an update to a substance of note included in the first disclosure being determined to materially alter the article, and storing the updated representative article on the blockchain.

* * * * *